United States Patent
Iwata et al.

(10) Patent No.: US 12,202,717 B2
(45) Date of Patent: Jan. 21, 2025

(54) TRANSPORT APPARATUS

(71) Applicant: Daifuku Co., Ltd., Osaka (JP)

(72) Inventors: Masashige Iwata, Hinocho (JP);
Kazunari Kimura, Hinocho (JP);
Hiroyoshi Murata, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 244 days.

(21) Appl. No.: 17/742,533

(22) Filed: May 12, 2022

(65) Prior Publication Data

US 2022/0363529 A1 Nov. 17, 2022

(30) Foreign Application Priority Data

May 13, 2021 (JP) ................................ 2021-081803

(51) Int. Cl.
*B66F 9/18* (2006.01)
*B66F 9/19* (2006.01)

(52) U.S. Cl.
CPC ................ *B66F 9/195* (2013.01); *B66F 9/18* (2013.01)

(58) Field of Classification Search
CPC .................................................... B65G 1/0435
See application file for complete search history.

(56) References Cited

U.S. PATENT DOCUMENTS

| | | | | | |
|---|---|---|---|---|---|
| 3,809,259 | A | * | 5/1974 | Pipes | B65G 1/0435 414/280 |
| 5,346,352 | A | * | 9/1994 | Ito | B65G 65/00 414/400 |
| 9,469,492 | B2 | * | 10/2016 | Kashihara | B65G 1/0435 |
| 9,994,394 | B2 | * | 6/2018 | Masuda | B65G 1/0421 |
| 10,913,641 | B2 | * | 2/2021 | Gravelle | B66F 9/122 |
| 11,414,312 | B2 | * | 8/2022 | Nobata | B65G 1/0407 |
| 11,485,575 | B2 | * | 11/2022 | Dooley | B65G 65/02 |
| 2021/0395007 | A1 | * | 12/2021 | Galluzzo | B66F 9/141 |
| 2022/0259023 | A1 | * | 8/2022 | Iwamoto | B66F 9/063 |

FOREIGN PATENT DOCUMENTS

JP 6337706 B2 5/2018

\* cited by examiner

*Primary Examiner* — Mark C Hageman
(74) *Attorney, Agent, or Firm* — The Webb Law Firm

(57) ABSTRACT

A transfer device includes: a pusher configured to push a container during a delivery operation; a lockable portion lockable to the container during a pick-up operation; a transfer drive unit configured to cause the pusher and the lockable portion to reciprocate in the transfer direction; and a lock drive unit configured to drive the lockable portion separately from the pusher and causes the lockable portion to change in orientation. The transfer device performs a delivery operation by moving, toward a delivery side in the transfer direction, the pusher in contact with a container rear face portion with use of the transfer drive unit, and performs a pick-up operation by moving the lockable portion in the locking orientation toward a pick-up side in the transfer direction with use of the transfer drive unit.

12 Claims, 17 Drawing Sheets

TRANSPORT APPARATUS

CROSS-REFERENCE TO RELATED APPLICATION

This application claims priority to Japanese Patent Application No. 2021-081803 filed May 13, 2021, the disclosure of which is hereby incorporated by reference in its entirety.

BACKGROUND OF THE INVENTION

1. Field of the Invention

The present invention relates to a transport apparatus that transports containers.

2. Description of the Related Art

JP 6337706B (Patent Document 1) discloses an example of a transfer device for transporting items to storage racks. In the following, the reference numerals in parentheses in the description of the background section are those used in Patent Document 1.

A transfer device (2) disclosed in Patent Document 1 has package placement sections (26) on which an item (10) is placeable, and a slide arm (28) having a plurality of hooks (30, 32, 34, 36). The transfer device (2) performs a delivery operation to transfer an item (10) from the placement sections (26) to a rack (12a, 12b) and a pick-up operation to transfer an item (10) from a rack (12a, 12b) to the placement sections (26) with use of the slidable arm (28).

The transfer device (2) disclosed in Patent Document 1 engages the hooks (30, 32, 34, 36) with handles (14a, 14b) of the item (10) when performing the delivery operation and when performing the pick-up operation. The transfer device (2) pulls the item (10) toward the placement sections (26) with use of the hooks (30, 32, 34, 36) when performing the pick-up operation. Conversely, the transfer device (2) pushes the item (10) toward the rack (12a, 12b) with use of the hooks (30, 32, 34, 36) when performing the delivery operation.

The technique disclosed in Patent Document 1 thus uses the hooks (30, 32, 34, 36) both during the delivery operation and during the pick-up operation. However, members having a shape such as that of the hooks (30, 32, 34, 36) disclosed in Patent Document 1 are not necessarily suitable to use in the delivery operation, although they are suitable to use in the pick-up operation. Moreover, the hooks (30, 32, 34, 36) need not be engaged with the handles (14a, 14b) to push the item (10). However, the transfer device (2) disclosed in Patent Document 1 performs such an operation to engage the hooks (30, 32, 34, 36), which is likely to extend the time required for the delivery operation.

SUMMARY OF THE INVENTION

In view of the above situation, it is desirable to realize a technique that is capable of easily shortening the time required for an operation to deliver a container and that facilitates implementation of a configuration suitable for performing an operation to deliver a container and an operation to pick-up a container.

A technique for solving the foregoing problem is as follows.

A transport apparatus that transports a container includes:
a transfer device having a holder configured to hold the container,
the transfer device being configured to move the container in a transfer direction parallel to a horizontal direction and perform transfer operations including: (i) a delivery operation, which is an operation to transfer the container from the holder to a transfer target location; and (ii) a pick-up operation, which is an operation to transfer the container from the transfer target location to the holder, and
the transfer device including:
a pusher configured to push the container during the delivery operation;
a lockable portion lockable to the container during the pick-up operation;
a transfer drive unit configured to cause the pusher and the lockable portion to reciprocate in the transfer direction; and
a lock drive unit configured to drive the lockable portion separately from the pusher and cause the lockable portion to change in orientation,
wherein the container includes:
a container front face portion facing a delivery side in the transfer direction, the delivery side in the transfer direction being a side in the transfer direction on which the transfer target location is located relative to the holder; and
a container rear face portion facing a pick-up side in the transfer direction and having a recessed portion that is open in a direction orthogonal to the transfer direction, the pick-up side in the transfer direction being a side in the transfer direction on which the holder is located relative to the transfer target location,
the lockable portion is capable of changing in orientation between a locking orientation, in which the lockable portion is insertable into the recessed portion, and a non-locking orientation, in which the lockable portion is outside the recessed portion, by being driven by the lock drive unit while a relative position of the lockable portion with respect to the container is in a predetermined lockable range,
the transfer device performs the delivery operation by, with use of the transfer drive unit, moving the pusher toward the delivery side in the transfer direction while the pusher is in contact with the container rear face portion, and
the transfer device performs the pick-up operation by, with use of the transfer drive unit, moving the lockable portion in the locking orientation toward the pick-up side in the transfer direction.

According to this configuration, the transfer device includes the pusher configured to push the container during the delivery operation, the lockable portion lockable to the container during the pick-up operation, and the transfer drive unit configured to cause the pusher and the lockable portion to reciprocate in the transfer direction. Further, the transfer device includes the lock drive unit configured to drive the lockable portion separately from the pusher and cause the lockable portion to change in orientation. Therefore, while the transfer device is performing the pick-up operation, the transfer device can cause the lockable portion to be locked to the container and move the container toward the pick-up side in the transfer direction by driving the lockable portion to assume the locking orientation. While the transfer device is performing the delivery operation, the transfer device can push the container with use of the pusher and move the container toward the delivery side in the transfer direction, without driving the lockable portion to be locked to the container. Accordingly, the time required to perform the operation to deliver the container can be easily shortened. With the pusher and the lockable portion, the transfer device is appropriately configured to perform the delivery operation (i.e., push the container) due to the pusher, and is also appropriately configured to perform the pick-up operation (i.e., pull the container) due to the lockable portion. That is, this configuration makes it easy to realize a configuration suitable for performing the operation to deliver the container and the operation to pick up the container.

Further features and advantages of the technique according to the present disclosure will become more apparent in the description of the following exemplary and non-limiting embodiment that will be described with reference to the drawings.

DETAILED DESCRIPTION OF PREFERRED EMBODIMENTS

A transport apparatus is an apparatus that transports containers. The following describes an embodiment of a transport apparatus with reference to an example in which the transport apparatus is provided in a transport facility in which containers are transported.

Figure 1:
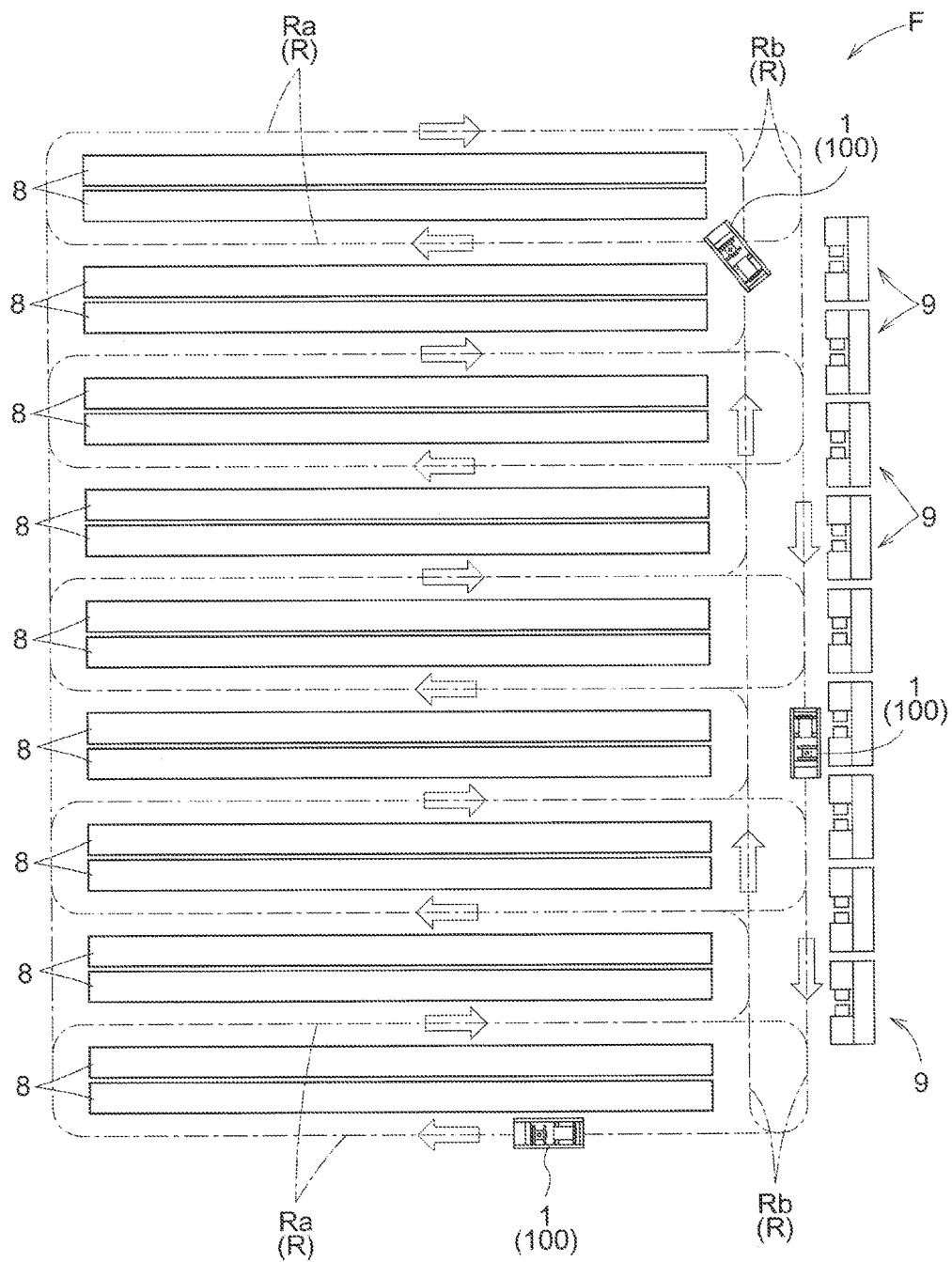
FIG. 1 is a plan view of a transport facility equipped with a transport apparatus.

A transport facility F includes container racks 8 for storing containers 70 (see FIGS. 3 and 4), and loading/unloading sections 9 for loading containers 70 into the transport facility F and unloading the containers 70 from the transport facility F, as shown in FIG. 1. Transport apparatuses 100 transport the containers 70 loaded through the loading/unloading sections 9 to the container racks 8, or transport the containers 70 stored in the container racks 8 to the loading/unloading sections 9 for unloading.

In the present embodiment, a plurality container racks 8 are arranged parallel to each other with regular spacings. Each of container racks 8 is open at least in a front face thereof. The containers 70 are delivered and picked up in this front face. Parts of a travel path R for the transport apparatuses 100 are set between adjacent container racks 8 whose front faces oppose each other. Container racks 8 arranged at the ends, of the plurality of container racks 8 provided in the transport facility F, are arranged with their front faces facing the outer side. Parts of the travel path R are also set in regions extending along the front faces of these container racks 8 at the ends. The transport facility F also includes a plurality of loading/unloading sections 9. Parts of the travel path R are also set in regions passing by the plurality of loading/unloading sections 9.

The travel path R includes paths Ra in a rack area, namely paths extending along the front faces of the container racks 8 in the direction in which these container racks 8 extend, and paths Rb outside the rack area, namely paths that intersect the paths Ra in the rack area, outside the region where the container racks 8 are arranged. The paths Ra in the rack area are set in correspondence with the respective container racks 8. In the present embodiment, the paths Ra in the rack area correspond to parts of the travel path R that are set in regions between adjacent pairs of the container racks 8 with the front faces thereof opposing each other, and parts of the travel path R that are set in regions extending along the front faces of the container racks 8 arranged with the front faces thereof facing outward. The paths Rb outside the rack area are set to connect the plurality of paths Ra in the rack area. The paths Rb outside the rack area are also set to pass the plurality of loading/unloading sections 9. In the present embodiment, the paths Rb outside the rack area correspond to parts of the travel path R other than the paths Ra in the rack area.

Container Rack

Figure 2:
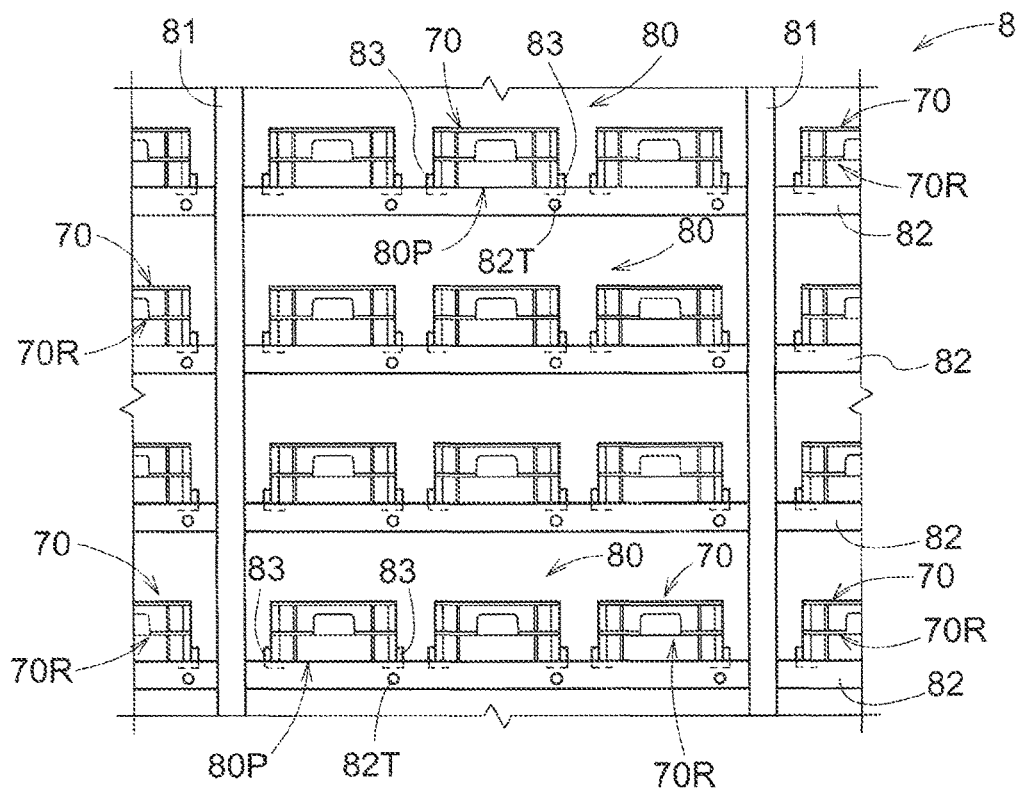
FIG. 2 is a front view of a container rack.

Each container rack 8 includes a plurality of shelf sections 80 for storing containers 70, the shelf sections 80 being arranged in the vertical direction, as shown in FIG. 2. Each shelf section 80 is a transfer target location T when a later-described transfer device 4 transfers a container 70. The container rack 8 in the present embodiment is a combination of a plurality of column members 81 and a plurality of beam members 82. The plurality of beam members 82 are spaced apart from each other in the vertical direction. Placement members 83 for placing containers 70 are attached to the plurality of beam members 82. In this example, a container 70 is stored in a shelf section 80 by being placed on a pair of placement members 83. A plurality of pairs of placement members 83 are arranged on each shelf section 80 such that a single shelf section 80 can store a plurality of containers 70. Note that in this example, the opening of the container rack 8 corresponds to a region between two column members 83 adjacent in the left-right direction as viewed from the front in FIG. 2 and between two beam members 82 adjacent in the vertical direction.

Each shelf section 80 in the present embodiment has target points 82T, each of which serves as a target for storing a container 70 at a reference position 80P for storing a container 70. In this example, the target points 82T are provided on the beam members 82. One target point 82T is provided for one pair of placement members 83. In the example shown in FIG. 2, the target points 82T are holes formed in the beam members 82.

Container

Figure 3:
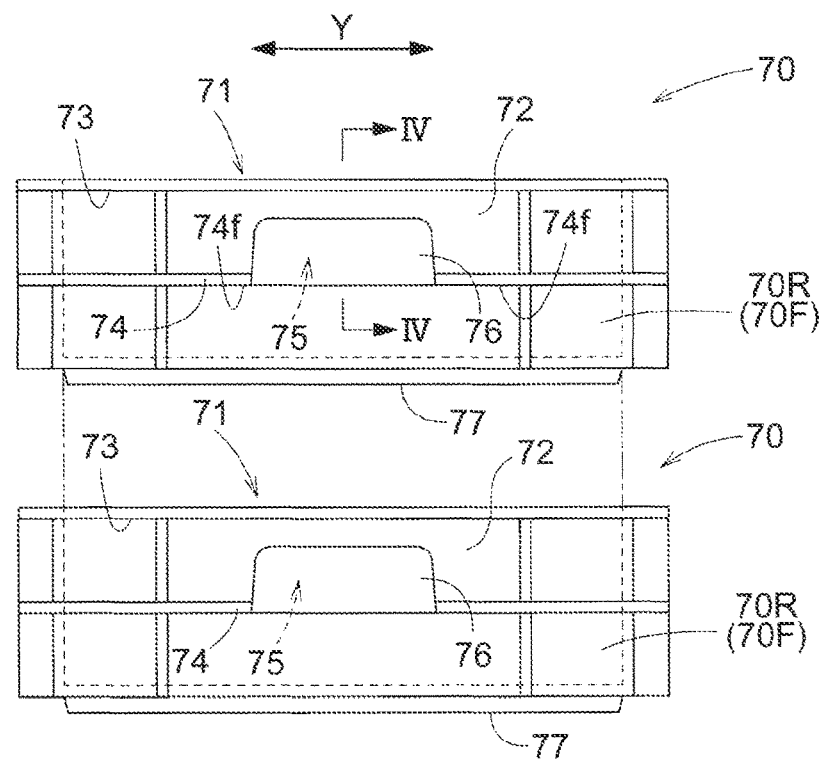
FIG. 3 is a front view of a container.

Each container 70 has a box shape and has an opening portion 71 that is open upward, and a peripheral wall portion 72 that surrounds an internal space in the container 70, as shown in FIG. 3. In this example, the outer shape of the container 70 as viewed in the vertical direction is a rectangular shape. The container 70 can contain an article in the internal space surrounded by the peripheral wall portion 72, namely inside the container 70. Examples of the articles include various products such as foodstuffs and household goods, or parts and work-in-progress used in factory production lines or the like.

In the present embodiment, a container 70 can be stacked with another container 70 with articles contained in these containers 70. That is, the containers 70 are stackable in the vertical direction (see also FIG. 5). In this example, each container 70 has a fitting portion 77 protruding downward from a bottom portion of the container 70. The fitting portion 77 of a container 70 is fitted, from above, to an opening portion 71 of another container 70. The two containers 70 are thus stacked in the vertical direction.

Each container 70 is moved in a specific direction by the later-described transfer device 4. When the direction in which each container 70 is moved by the transfer direction 4 is referred to as a transfer direction X (see FIG. 4), the container 70 is moved in the transfer direction X by the transfer device 4. More specifically, when the transfer device 4 delivers a container 70 to the transfer target location T, the container 70 moves toward one side in the transfer direction X (which will be hereinafter referred to as a "delivery side X1 in the transfer direction"). When the transfer device 4 picks up a container 70 in the transfer target location, the container 70 moves toward the other side in the transfer direction X (which will be hereinafter referred to as a "pick-up side X2 in the transfer direction").

A portion of each container 70 that faces the delivery side X1 in the transfer direction will be referred to as a container front face portion 70F. Further, a portion of each container 70 that faces the pick-up side X2 in the transfer direction will be referred to as a container rear face portion 70R (see FIG. 4). Each container 70 is stored in a shelf section 80 with the container rear face portion 70R facing the front face of the container rack 8, as shown in FIG. 2.

Figure 4:
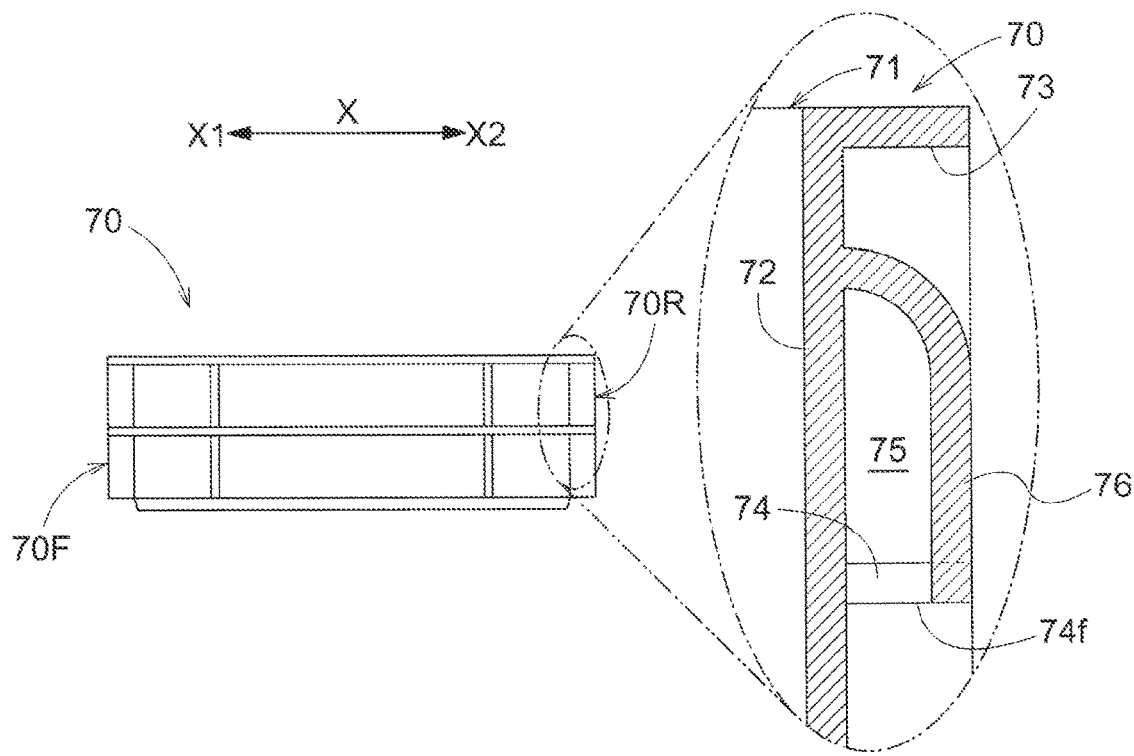
FIG. 4 is a side view of the container.

Each container 70 in the present embodiment has a plurality of rib portions protruding outward from the peripheral wall portion 72, as shown in FIGS. 3 and 4. Some of the plurality of rib portions are lifting rib portions 73 that are lifted by a later-described lift device 3. In this example, the lifting rib portions 73 are located in an upper part of the peripheral wall portion 72. The lifting rib portions 73 are formed over the entire periphery of a part of the peripheral wall portion 72 that surrounds the opening portion 71. Some of the plurality of rib portion are transfer rib portions 74 that are lifted when the later-described transfer device 4 performs a transfer operation. In this example, the transfer rib portions 74 are located below the transfer rib portions 74. One of the transfer rib portions 74 is provided on the container rear face portion 70R. In this example, the transfer rib portion 74 are provided on both the container rear face portion 70R and the container front face portion 70F. Note that the container rear face portion 70R and the container front face portion 70F in the present embodiment have the same configuration.

The container rear face portion 70R has a recessed portion 75 that is open in a direction orthogonal to the transfer direction X. The recessed portion 75 in the present embodiment is open vertically downward. The recessed portions 75 are formed in faces of each container 70 that have the transfer rib portions 74 (the container rear face portion 70R and the container front face portion 70F in this example). Each container 70 in this example has a locking wall portion 76 protruding outward from the peripheral wall portion 72 and extending downward in a space in the vertical direction between the lifting rib portion 73 and the transfer rib portion 74. The recessed portion 75 is formed between this locking wall portion 76 and the peripheral wall portion 72. In this example, the recessed portion 75 is covered by the peripheral wall portion 72 on the delivery side X1 in the transfer direction, and is covered by the locking wall portion 76 on the pick-up side X2 in the transfer direction. In other words, the recessed portion 75 is a space surrounded by the peripheral wall portion 72 and the locking wall portion 76. The locking wall portion 76 is a portion to which a lockable portion Bb (see FIG. 9) is locked while the transfer device 4 is performing the transfer operation, as will be described later.

When a direction orthogonal to the transfer direction X as viewed along the vertical direction is referred to as a width direction Y, the recessed portions 75 in the present embodiment are located at middle portions, in the width direction Y, of the container rear face portion 70R and the container front face portion 70F. Further, the recessed portion 75 in this example extends in the width direction Y and the vertical direction.

The container rear face portion 70R in the present embodiment has a supported face 74f that faces downward. The supported face 74f in this example is formed in the transfer rib portion 74. In other words, a face of the transfer rib portion 74 that faces downward is the supported face 74f. The supported face 74f is a portion supported from below by supporters Bss (see FIG. 9) of the transfer device 4 while the transfer device 4 is performing the transfer operation, as will be described later.

Transport Apparatus

Figure 5:
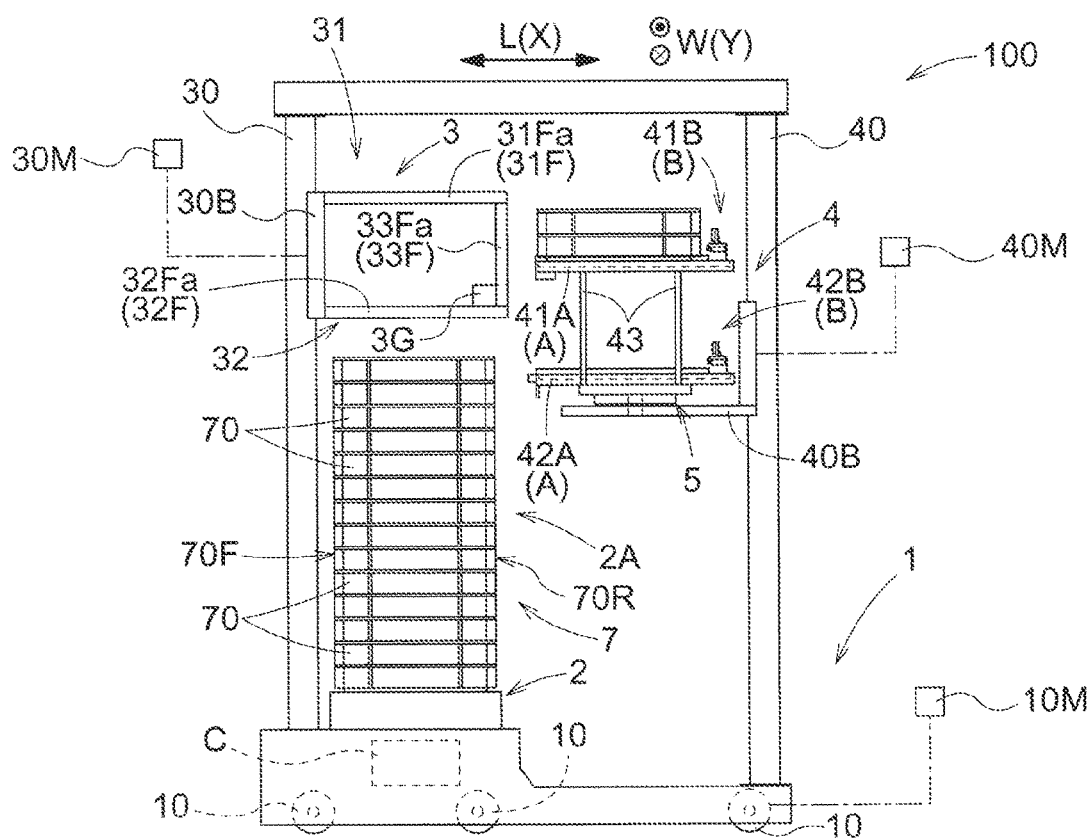
FIG. 5 shows the transport apparatus as viewed from a width direction of a vehicle body.

The transport apparatus 100 includes a traveling body 1 configured to travel, a container group supporter 2 for supporting a container group 7 that includes a plurality of stacked containers 70 in a predetermined stacking region 2A, a lift device 3 for lifting the containers 70 of the container group 7 supported by the container group supporter 2, and a transfer device 4 for transferring the containers 70, as shown in FIG. 5. The container group supporter 2, the lift device 3, and the transfer device 4 are mounted on the traveling body 1. When a direction parallel to the traveling direction of the traveling body 1 is referred to as a "front-back direction L of the vehicle body", the container group supporter 2 and the transfer device 4 are arranged on the traveling body 1, side by side in the front-back direction L of the vehicle body. Note that a direction orthogonal to the front-back direction L of the vehicle body as viewed in the vertical direction is referred to as a "width direction W of the vehicle body" below.

In the present embodiment, the transport apparatus 100 includes a control device C. The control device C controls functional units of the transport apparatus 100. The control device C in this example controls the traveling body 1, the container group supporter 2, the lift device 3, the transfer device 4, and a later-described turning device 5. Operations for transporting and transferring the containers 70 are realized by the control device C controlling the functional units. The control device C includes, for example, a processor such as a microcomputer, peripheral circuits such as a memory, and the like. Each function is realized by cooperation of these pieces of hardware and programs executed on the processors such as a computer.

Traveling Body

The traveling body 1 travels through the predetermined travel path R (see FIG. 1). The traveling body 1 in the present embodiment travels through the paths Ra in the rack area and the paths Rb outside the rack area. The traveling body 1 travels along the container racks 8 while traveling through the paths Ra in the rack area; more specifically, the traveling body 1 travels along the front faces of the container racks 8. The traveling body 1 in the present embodiment travels on a floor surface.

The traveling body 1 has a plurality of traveling wheels 10, and a travel drive unit 10M for driving at least one of the plurality of traveling wheels 10. The travel drive unit 10M includes a motor, which is not shown in the figures. The travel drive unit 10M applies a driving force in the traveling direction to the traveling body 1 by driving the traveling wheel(s) 10.

Container Group Supporter

The container group supporter 2 is mounted on the traveling body 1. The container group supporter 2 can support a container group 7, which includes a plurality of stacked containers 70. A stacking region 2A, in which the container group 7 is arrangeable, is defined above the container group supporter 2. The stacking region 2A is a three-dimensional virtual region extending upward from the container group supporter 2. The container group supporter 2 in this example is configured as a conveyor capable of moving the container group 7 placed thereon. The container group supporter 2 in this example can move the container group 7 in the width direction W of the vehicle body. The conveyor constituting the container group supporter 2 may be, for example, any known conveyor such as a roller conveyor, a chain conveyor, or a belt conveyor.

A container group 7, which includes a plurality of stacked containers 70, is loaded to one of the loading/unloading section 9 (see FIG. 1). The container group supporter 2 receives the container group 7 from the loading/unloading section 8, or delivers the container group 7 to the loading/unloading section 9 with the traveling body 1 being next to the loading/unloading section 8. That is, the container group supporter 2 receives the container group 7 from, and delivers the container group 7 to, the loading/unloading section 9. Although not specifically shown, the loading/unloading section 9 in this example is adjacent to a picking area where the work of taking articles out of the containers 7 is performed.

After the container group 7 has been delivered from the container group supporter 2 to the loading/unloading section 9, the articles are taken out of the containers 70 in the picking area adjacent to the loading/unloading section 9. After some or all of the articles contained in the containers 70 have been taken out, these containers 70 are delivered from the loading/unloading section 9 to the container group supporter 2 (transport apparatus 100) and transported to a container rack 8 again. However, the loading/unloading section 9 need not be adjacent to the picking area, and may alternatively be adjacent to any other facility or work area. For example, each loading/unloading section 9 may transport the container group 7 delivered from the container group supporter 2 to outside the transport facility F.

Lift Device

The lift device 3 is mounted on the traveling body 1. The lift device 3 lifts the containers 70 of the container group 7 supported by the container group supporter 2, i.e., the containers 70 of the container group 7 arranged in the stacking region 2A.

The lift device 3 has a lifting mast 30, which stands upward on the traveling body 1, a lifting elevator 30B joined to the lifting mast 30, and a lifting elevator drive unit 30M for raising and lowering the lifting elevator 30B along the lifting mast 30. Although not specifically shown, the lifting elevator drive unit 30M has an endless body such as a belt that is joined to the lifting elevator 30B, a rotating body around which the endless body is wound, and a motor for driving the rotating body to rotate, for example.

The lift device 3 has a first lift mechanism 31 for lifting a container 70 at a specific height in the stacked container group 7 in the stacking region 2A relative to a container 70 immediately below the container 70 to be lifted, and a second lift mechanism 32 for lifting a container 70 located below the container 70 lifted by the first lift mechanism 31 relative to a container 70 immediately below the container 70 to be lifted by the second lift mechanism 32. The first lift mechanism 31 and the second lift mechanism 32 in the present embodiment are spaced apart in the vertical direction.

The lift device 3 in the present embodiment has a first frame portion 31F and a second frame portion 32F that protrude in the front-back direction L of the vehicle body from the lifting elevator 30B toward the stacking region 2A, and a joint frame portion 33 that joins the first frame portion 31F to the second frame portion 32F. The first frame portion 31F and the second frame portion 32F are spaced apart in the vertical direction. The first frame portion 31F is arranged above the second frame portion 32F. The joint frame portion 33F joins the first frame portion 31F to the second frame 32F in the vertical direction. This configuration does not allow the first frame portion 31F and the second frame portion 32F to move relatively. The spacing in the vertical direction between the first frame portion 31F and the second frame portion 32F is always fixed. The first frame portion 31F, the second frame portion 32F, and the joint frame portion 33F integrally rises and lowers with the lifting elevator 30B rising and lowering.

Although not specifically shown, the first frame portion 31F in the present embodiment has two first frame members 31Fa spaced apart in the width direction W of the vehicle body. The two first frame members 31Fa are arranged in correspondence with the width (length in the width direction W of the vehicle body) of the containers 70 arranged in the stacking region 2A. The second frame member 32F has two second frame members 32Fa spaced apart in the width direction W of the vehicle body. The two second frame members 32Fa are arranged in correspondence with the width of the containers 70 arranged in the stacking region 2A. The joint frame portion 33F has two joint frame members 33Fa. The two joint frame members 33Fa join the first frame member 31Fa and the second frame member 32Fa, which are arranged in the vertical direction, to each other.

Figure 7:
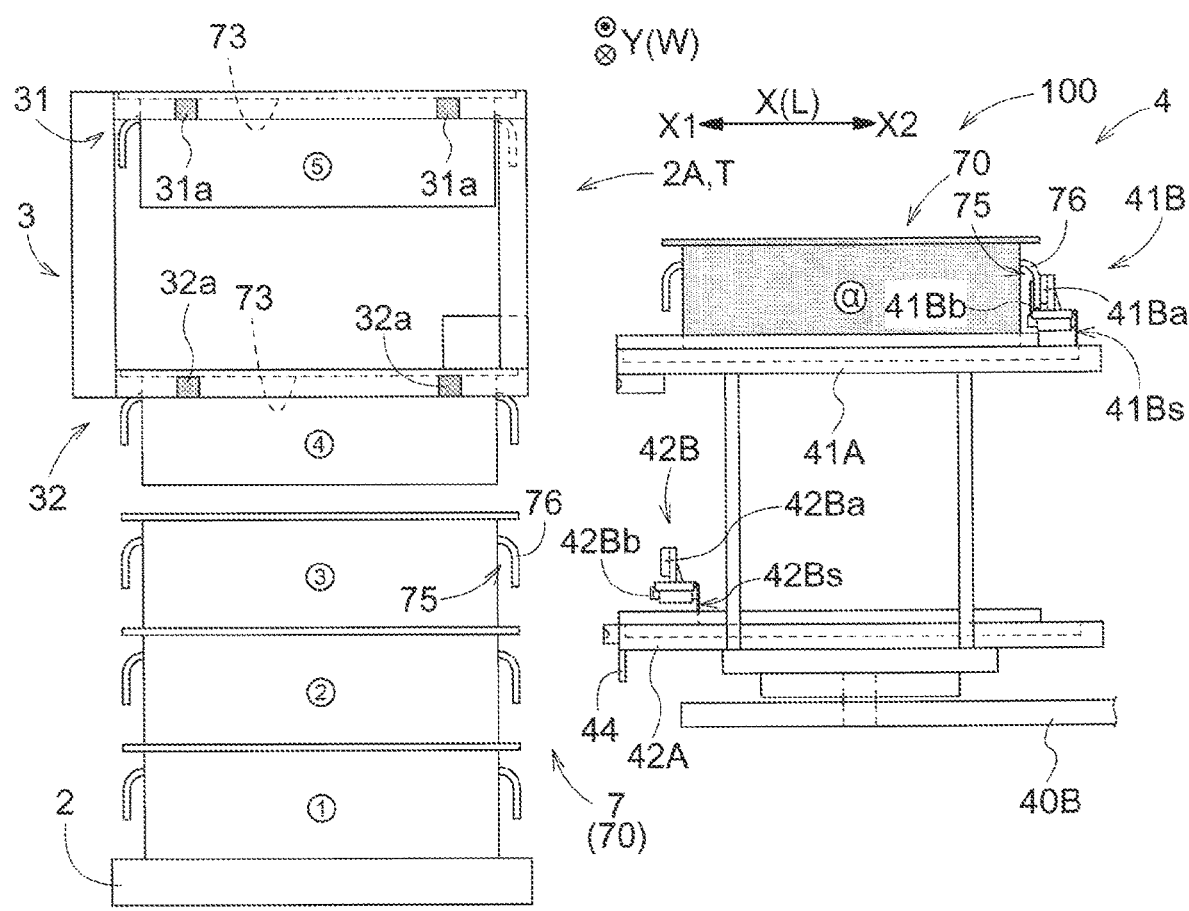
FIG. 7 shows a lift device lifting containers in a stacking region.

For example, the lift device 3 can form a space in the vertical direction between a container 70 lifted by the first lift mechanism 31 and a container 70 lifted by the second lift mechanism 32, as shown in FIG. 7. The lift device 3 can also form a space in the vertical direction below the container 70 lifted by the second lift mechanism 32.

The first lift mechanism 31 in the present embodiment has first lift holders 31a for holding a container 70, and a first lift drive unit (not shown) for changing the orientation of the first lift holders 31a. Although not specifically shown, the first lift drive unit changes the orientation of the first lift holders 31a between a holding orientation in which the first lift holders 31a hold a container 70, and a non-holding orientation in which the first lift holders 31a do not hold a container 70. FIG. 7 shows the first lift holders 31a in the holding orientation. The first lift holders 31a in the present embodiment hold the lifting rib portions 73 of a container 70 from below by assuming the holding orientation. The first lift holders 31a thus lift the container 70.

Similarly, the second lift mechanism 32 has second lift holders 32a for holding a container 70, and a second lift drive unit (not shown) for changing the orientation of the second lift holders 32a. Although not specifically shown, the second lift drive unit changes the orientation of the second lift holders 32a between a holding orientation in which the second lift holders 32 hold a container 70, and a non-holding orientation in which the second lift holders 32a do not hold a container 70. FIG. 7 shows the second lift holders 32a in the holding orientation. The second lift holders 32a in the present embodiment hold the lifting rib portions 73 of a container 70 from below by assuming the holding orientation. The second lift holders 32a thus lift the container 70.

In FIG. 7, the containers 70 stacked in the stacking region 2A are assigned numerals "1 to 5" in the ascending order from the bottom to the top. A container 70 held by the transfer device 4 is assigned a letter "a".

If a space is formed in the vertical direction between the container 70 lifted by the first lift mechanism 31 and the container 70 lifted by the second lift mechanism 32, another container 70 can be delivered into this space. That is, the transfer device 4 can stack another container 70 on the container 70 lifted by the second lift mechanism 32. FIG. 7 shows an example where a container 70 (container "α") held by the transfer device 4 is loaded into the space formed in the vertical direction between the container 70 (container "5") lifted by the first lift mechanism 31 and the container 70 (container "4") lifted by the second lift mechanism 32.

If a space is formed in the vertical direction below the container 70 lifted by the second lift mechanism 32, a container 70 arranged below the container 70 lifted by the second lift mechanism 32 can be picked up with use of this space. FIG. 7 shows an example where a container 70 (container "3") arranged below the container 70 (container "4") lifted by the second lift mechanism 32 is picked up. Note that the operation to deliver a container 70 to the stacking region 2A and the operation to pick up a container 70 from the stacking region 2A will be described later.

The second lift mechanism 32 in the present embodiment has a guide 3G for guiding a container 70 transferred by the transfer device 4, as shown in FIG. 5. Although not specifically shown, the guide 3G includes two guide members Ga spaced apart in the width direction W of the vehicle body. The spacing between the two guide members 3Ga in the width direction W of the vehicle body corresponds to the width of the containers 70. Here, each guide member 3Ga is provided to a corresponding one of the two second frame members 32Fa. The guide members 3Ga have a plate-like shape standing from the second frame members 32Fa, and guide a container 70 with use of a plate surface facing inward in the width direction W of the vehicle body.

Transfer Device

The transfer device 4 is mounted on the traveling body 1, as shown in FIG. 5. The transfer device 4 has holders A for holding containers 70, and moves the containers 70 in the transfer direction X, which is parallel to the horizontal direction, to perform a delivery operation to transfer a container 70 from a holder A to the transfer target location T and a pick-up operation to transfer a container 70 from the transfer target location T to a holding unit A. The transfer device 4 in the present embodiment has transfer machines B, and performs the operation to deliver a container 70 to the transfer target location T and the operation to pick up a container 70 from the transfer target location T, with use of these transfer machines B. The transfer target location T includes the stacking region 2A and a shelf section 80 of a container rack 8.

Here, the moving direction of the container 70 transferred by the transfer device 4 is referred to as a transfer direction X, as mentioned above. The transfer target location T side relative to the holders A in the transfer direction X is referred to as the "delivery side X1 in the transfer direction", and the holder A side relative to the transfer target location T to the holding units A in the transfer direction X is referred to as the "pick-up side X2 in the transfer direction". The transfer direction X is a direction parallel to the horizontal direction. The delivery side X1 in the transfer direction is the side toward which a container 70 moves in the transfer direction X when this container 70 is delivered. The pick-up side X2 in the transfer direction is the side toward which a container 70 moves in the transfer direction X when this container 70 is picked up.

Figure 6:
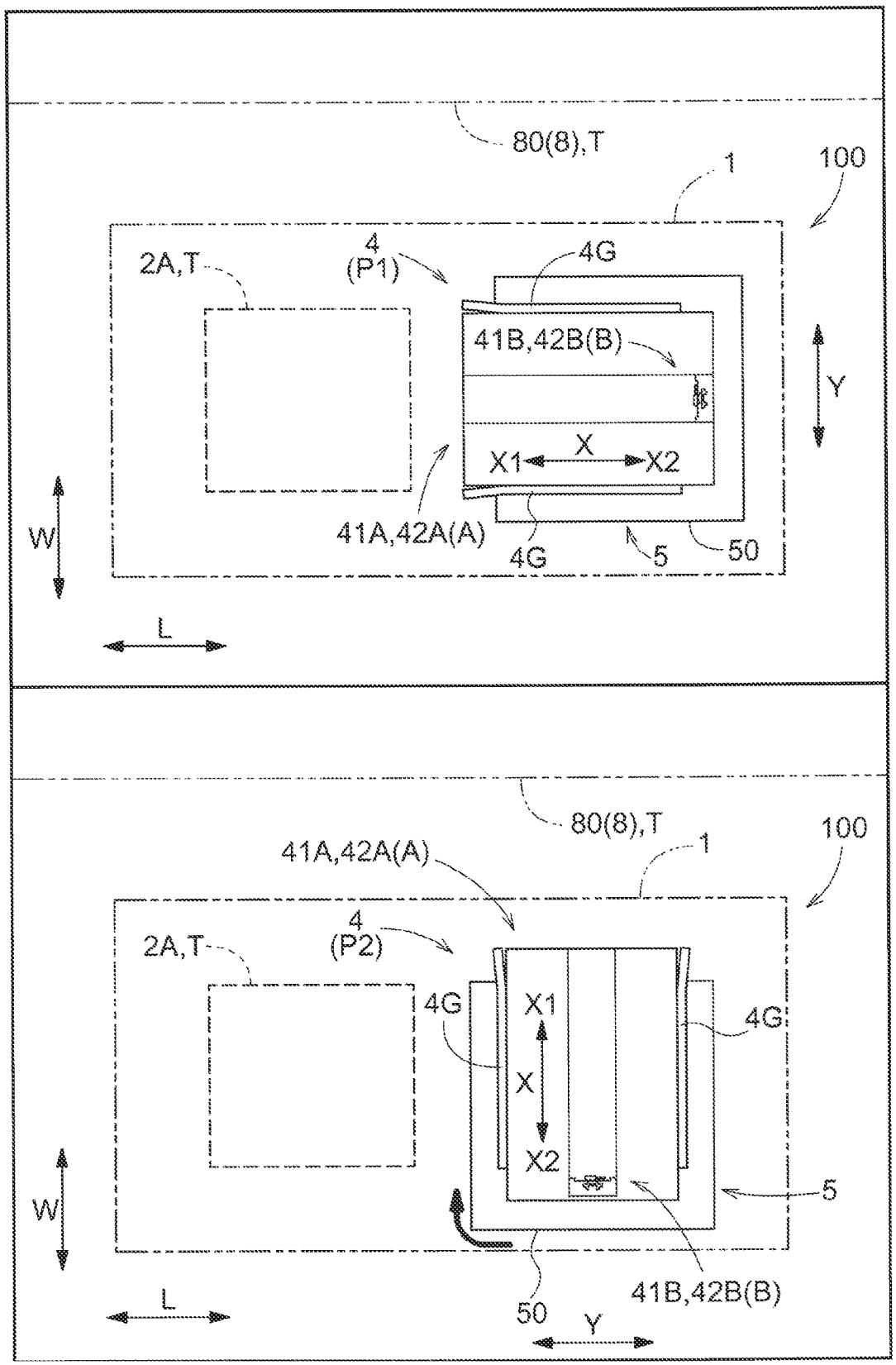
FIG. 6 shows plan views of a transfer device in a first orientation and a second orientation, respectively.

The transport apparatus 100 in the present embodiment has a turning device 5 for turning the transfer device 4 about an axis parallel to the vertical direction. The turning device 5 turns the transfer device 4 about the vertical axis to change the direction of the transfer device 4 between a first orientation P1 in which the transfer direction X extends toward the stacking region 2A, and a second orientation P2 in which the transfer direction X extends toward the container rack 8, as shown in FIG. 6. The transfer direction X in this embodiment can thus be changed in a horizontal plane by the turning device 5.

Figure 8:
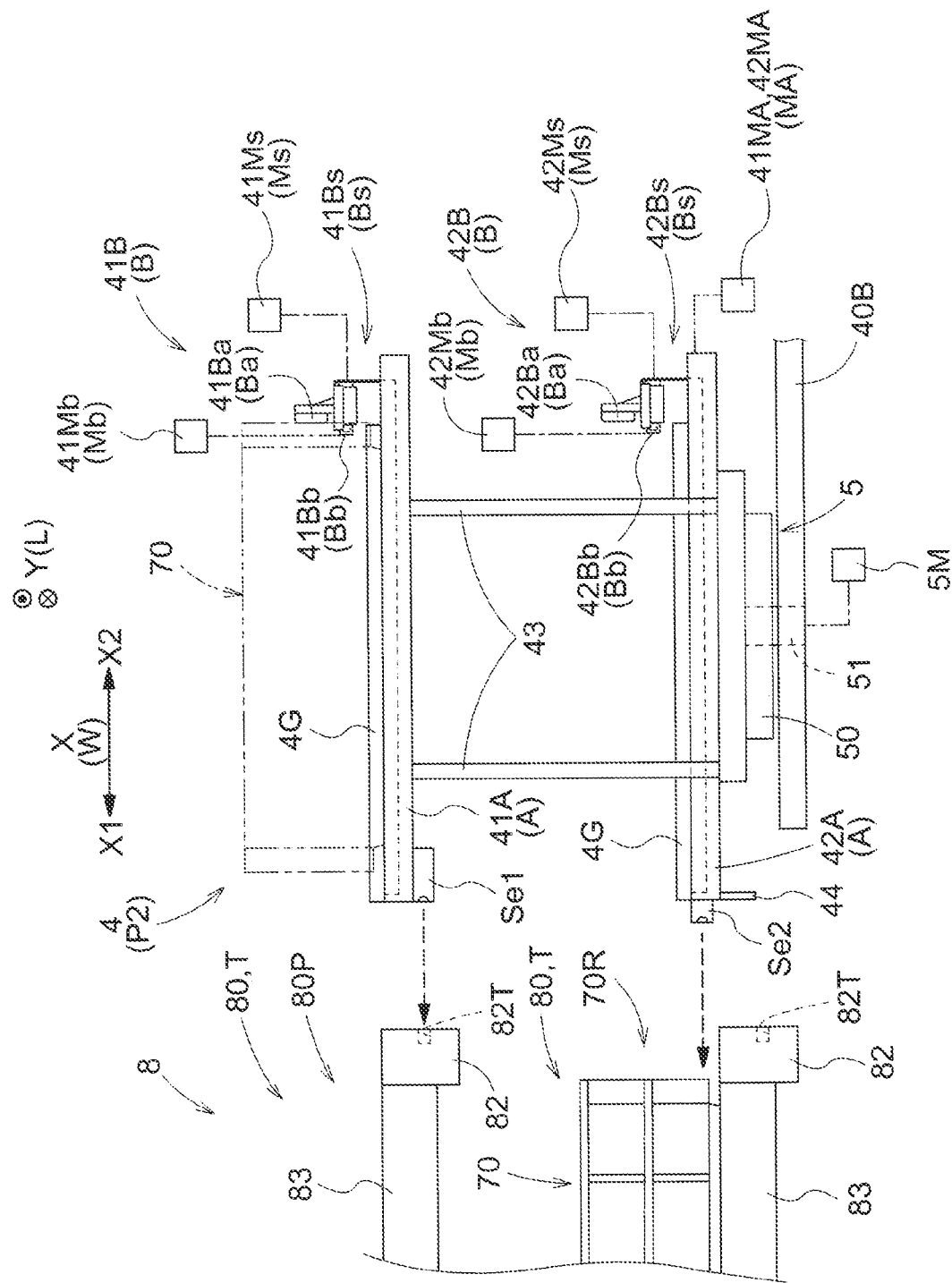
FIG. 8 shows the transfer device as viewed from the width direction orthogonal to a transfer direction.

The transfer device 4 in the present embodiment changes the orientation thereof in accordance with the position of the transfer target location T. Specifically, the transfer device 4 assumes the first orientation P1 while the transfer target location T is the stacking region 2A, and assumes the second orientation P2 while the transfer target location T is the shelf section 80 (container rack 8). The turning device 5 in this example has a turning base 50 for supporting the transfer device 4, a turning shaft 51 for turnably supporting the turning table 50 relative to a later-described transfer elevator 40B, and a turning drive unit 5M for driving the turning shaft 51, as shown in FIG. 8. Note that FIG. 8 shows the transfer device 4 in the second orientation P2.

The transfer device 4 has a transfer mast 40, which stands upward on the traveling body 1, the transfer elevator 40B joined to the transfer mast 40, and a transfer elevator drive unit 40M for raising and lowering the transfer elevator 40B along the transfer mast 40, as shown in FIG. 5. Although not specifically shown, the transfer elevator drive unit 40M includes, for example, an endless body such as a belt joined to the transfer elevator 40B, a rotating body around which the endless body is wound, and a motor for driving the rotating body.

The transfer device 4 has pushers Ba for pushing containers 70 during the delivery operation, lockable portions Bb lockable to containers 70 during the pick-up operation, and transfer drive units Ms for causing the pushers Ba and the lockable portions Bb to reciprocate in the transfer direction X, as shown in FIG. 8. The transfer device 4 in the present embodiment has support members Bs for supporting the pushers Ba and the lockable portions Bb. The transfer drive units Ms causes the support members Bs to reciprocate in the transfer direction X. The support members Bs in this example are held by the holders A, and are relatively moved in the transfer direction X with respect to the holders A by the transfer drive units Ms. The pushers Ba and the lockable portions Bb relatively move in the transfer direction X with respect to the holders A as a result of the support members Bs being driven by the transfer drive units Ms to relatively move in the transfer direction X relative to the holders A. The transfer machines B in this example includes the pushers Ba, the lockable portions Bb, and the support members Bs.

The transfer device 4 in the present embodiment has a first holder 41A for holding a container 70, a second holder 42A for holding a container 70, the second holder 42A being arranged below the first holder 41A, a first transfer machine 41B for transferring a container 70 between the first holder 41A and the transfer target location T, and a second transfer machine 42B for transferring a container 70 between the second holder 42A and the transfer target location T. That is, the holders A include the first holder 41A and the second holder 42A. The transfer machines B include the first transfer machine 41B and the second transfer machine 42B. In the following, the first holder 41A and the second holder 42A are collectively referred to as the "holder A" in some cases. The first transfer machine 41B and the second transfer machine 42B are collectively referred to as the "transfer machine B" in some cases.

The transfer target location T includes the stacking region 2A and a shelf section 80 of a container rack 8, as mentioned above. That is, the first transfer machine 41B transfers a container 70 between the first holder 41A and the stacking region 2A or a shelf section 80. The second transfer machine 42B transfers a container 70 between the second holder 42A and the stacking region 2A or a shelf section 80. The first transfer machine 41B in the present embodiment transfers a container 70 between the first holder 41A and the stacking region 2A while assuming the first orientation P1, and transfers a container 70 between the first holder 41A and a shelf section 80 while assuming the second orientation P2, as shown in FIG. 6. Similarly, the second transfer machine 42B transfers a container 70 between the second holder 42A and the stacking region 2A while assuming the first orientation P1, and transfers a container 70 between the first holder 42A and a shelf section 80 while assuming the second orientation P2.

The transfer device 4 in the present embodiment has holder joints 43 for joining the first holder 41A to the second holder 42A in the vertical direction, as shown in FIG. 8. The holder joints 43 join the first holder 41A to the second holder 42A with a constant spacing therebetween in the vertical direction.

The transfer direction 4 has holder drive units Ma for moving the holders A in the transfer direction X. The holder drive units MA in the present embodiment include a first holder drive unit 41MA for moving the first holder 41A in the transfer direction X, and a second holder drive unit 42MA for moving the second holder drive unit 42A in the transfer direction X. The first holder drive unit 41MA relatively moves the first holder 41A in the transfer direction X with respect to the transfer elevator 40B. The second holder drive unit 42MA relatively moves the second holder 42A in the transfer direction X with respect to the transfer elevator 40B. The first holder 41A and the second holder 42A in the present embodiment are joined by the holder joints 43, as mentioned above. Therefore, the first holder 41A and the second holder 42A integrally move in the transfer direction X. In this example, the first holder drive unit 41MA for driving the first holder 41A and the second holder drive unit 42MA for driving the second holder 42A are driven by a common driving source. In the following, the first holder drive unit 41MA and the second holder drive unit 42MA are collectively referred to as the "holder drive unit MA" in some cases.

The pushers Ba in the present embodiment include a first pusher 41Ba and a second pusher 42Ba. The lockable portions Bb include a first lockable portion 41Bb and a second lockable portion 42Bb. The first transfer machine 41B in this example includes the first pusher 41Ba for pushing a container 70 toward the delivery side X1 in the transfer direction" while the operation to deliver the container 70 is being performed, and the first lockable portion 41Bb that is locked to a container 70 while the operation to pick up the container 70 is being performed. The first pusher 41Ba and the first lockable portion 41Bb can relatively move in the transfer direction with respect to the first holder 41A. Also, the second transfer machine 42B in this example includes the second pusher 42Ba for pushing a container 70 toward the delivery side X1 in the transfer direction while the operation to deliver the container 70 is being performed, and the second lockable portion 42Bb that is locked to a container 70 while the operation to pick up the container 70 is being performed. The second pusher 42Ba and the second lockable portion 42Bb can relatively move in the transfer direction with respect to the second holder 42A. In the following, the first pusher 41Ba and the second pusher 42Ba may be collectively referred to as the "pusher Ba". The first lockable portion 41Bb and the second lockable portion 42Bb are collectively referred to as the "lockable portion Bb" in some cases.

The support members Bs in the present embodiment include a first support member 41Bs and a second support member 42Bs. The transfer drive units Ms include a first transfer drive unit 41Ms and a second transfer drive unit 42Ms. The first support member 41Bs in this example is supported by the first holder 41A, and supports the first pusher 41Ba and the first lockable portion 41Bb. The first pusher 41Ba and the first lockable portion 41Bb relatively move in the transfer direction X with respect to the first holder 41A as a result of the first transfer drive unit 41Ms driving the first support member 41Bs. The second support member 42Bs in this example is supported by the second holder 42A, and supports the second pusher 42Ba and the second lockable portion 42Bb. The second pusher 42Ba and the second lockable portion 42Bb relatively move in the transfer direction X with respect to the second holder 42A as a result of the second transfer drive unit 42Ms driving the second support member 42Bs. In the following, the first support member 41Bs and the second support member 42Bs are collectively referred to as the "support member Bs" in some cases. The first transfer drive unit 41Ms and the second transfer drive unit 42Ms are collectively referred to as the "transfer drive unit Ms" in some cases.

The first pusher 41Ba and the first lockable portion 41Bb in the present embodiment integrally move in the transfer direction X. The area where the first pusher 41Ba and the first lockable portion 41Bb are movable in the transfer direction X is larger than the area where the first holder 41A is movable in the transfer direction X. When a container 70 is transferred to and from the transfer target location T (the stacking region 2A or a shelf section 80) in the present embodiment, the container 70 is transferred with use of the first pusher 41Ba or the first lockable portion 41Bb with the first holder 41A being close to the transfer target location T. The gap between the first holder 41A and the transfer target location T can thus be reduced during the transfer operation, enabling the first transfer machine 41B to stably transfer the container 70.

Similarly, the second pusher 42Ba and the second lockable portion 42Bb in the present embodiment integrally move in the transfer direction X. The area where the second pusher 42Ba and the second lockable portion 42Bb are movable in the transfer direction X is larger than the area where the second holder 42A is movable in the transfer direction X. When a container 70 is transferred to and from the transfer target location T (the stacking region 2A or a shelf section 80) in the present embodiment, the container 70 is transferred with use of the second pusher Ba or the second lockable portion 42Bb with the second holder 42A being close to the transfer target location T. The gap between the second holder 42A and the transfer target location T can thus be reduced during the transfer operation, enabling the second transfer machine 42B to stably transfer the container 70.

The transfer device 4 has lock drive units Mb for driving the lockable portions Bb separately from the pushers Ba and causing the lockable portions Bb to change in orientation. The lock drive units Mb in the present embodiment rotate the lockable portions Bb about respective rotation axes Bxa (see FIG. 9) parallel to the transfer direction X. The lock drive units Mb in the present embodiment include a first lock drive unit 41Mb and a second lock drive unit 42 Mb. The first transfer machine 41B in this example includes the first lock drive unit 41Mb. The first lock drive unit 41Mb drives the first lockable portion 41Bb. Specifically, the first lock drive unit 41Mb drives the first lockable portion 41Bb to rotate about a rotation axis Bxa parallel to the transfer direction X. Also, the second transfer machine 42B in this example includes the second lock drive unit 42 Mb. The second lock drive unit 42 Mb drives the second lockable portion 42Bb. Specifically, the second lock drive unit 42 Mb drives the second lockable portion 42Bb to rotate about a rotation axis Bxa parallel to the transfer direction X. In the following, the first lock drive unit 41Mb and the second lock drive unit 42 Mb are collectively referred to as the "lock drive unit Mb" in some cases.

In the present embodiment, the transfer device 4 has a reference position detection sensor Se1 for detecting a reference position 80P (see FIG. 2) for storing a container 70 in a shelf section 80, and a stored container detection sensor Se2 for detecting a container 70 stored in a shelf section 80, as shown in FIG. 8.

The target point 82T is provided at each reference position 80P in the shelf sections 80, as mentioned above with reference to FIG. 2. The reference position detection sensor Se1 in the present embodiment detects the positional relationship between the transfer device 4 having the reference position detection sensor Se1 and a reference position 80P in a shelf section 80 by detecting the target point 82T. The traveling body 1, the turning device 5, and the transfer elevator drive unit 40M of the transfer device 4 are controlled to perform an operation to correct the position of the transfer device 4 based on the result of the reference position detection sensor Se1 detecting the target point 82T. The transfer device 4 can thus appropriately transfer a container 70 to and from the shelf section 80. The reference position detection sensor Se1 in this example is constituted by a camera. The reference position detection sensor Se1, which is configured as a camera, can detect the positional relationship between the transfer device 4 and the target point 82T provided on the beam member 82 through image recognition. The reference position detection sensor Se1 in this example also functions as a ranging sensor for detecting the distance from a target. When the transfer device 4 transfers a container 70 to and from the transfer target location T, the reference position detection sensor Se1 detects the distance from the transfer target point T. This configuration enables the transfer operation to be performed highly reliably.

The stored container detection sensor Se2 detects whether or not a container 70 is present in a space in a shelf section 80 to which the transfer device 4 is about to transfer a container 70, when the transfer device 4 performs the delivery operation to transfer the container 70 to the shelf section 80. The transfer device 4 performs the delivery operation to transfer the container 70 to the shelf section 80 if the stored container detection sensor Se2 detects no container 70 in the target space in the shelf section 80 that is the delivery destination. If the stored container detection sensor Se2 detects that a container 80 is present in the target space in the shelf section 80 that is the delivery destination, the transfer device 4 may transfer the container 70 to another vacant space in the shelf section 80, or may stop transferring the container 70. In this example, the stored container detection sensor Se2 may be configured as a ranging sensor for detecting the distance from a target. This configuration enables the transfer device 4 to perform the transfer operation while measuring the distance between the transfer device 4 and the transfer target location T. The stored container detection sensor Se2 in the present embodiment is configured as an optical sensor that projects light to a target. However, the stored container detection sensor Se2 is not limited to this configuration, and may alternatively be configured using any known means, such as an ultrasonic sensor or a camera.

The reference position detection sensor Se1 is provided to one of the pair of the first holder 41A and the first transfer machine 41B and the pair of the second holder 42A and the second transfer machine 42B. The stored container detection sensor Se2 is provided to the other one of the pair of the first holder 41A and the first transfer machine 41B and the pair of the second holder 42A and the second transfer machine 42B, i.e., the pair to which the reference position detection sensor Se1 is not provided. The reference position detection sensor Se1 in the present embodiment is provided to the pair of the first holder 41A and the first transfer machine 41B. The reference position detection sensor Se1 in this example is provided to the first holder 41A. Note that the reference position detection sensor Set may alternatively be provided to the first transfer machine 41B. The stored container detection sensor Se2 in the present embodiment is provided to the pair of the second holder 42A and the second transfer machine 42B. In this example, the stored container detection sensor Se2 is provided to the second holder 42A. Note that the stored container detection sensor Se2 may alternatively be provided to the second transfer machine 42B.

The following is a detailed description of a structure of the transfer machine B and an operation to transfer a container 70 performed by the transfer machine B, with reference to FIGS. 9 to 16.

Structure of Transfer Machine

Figure 9:
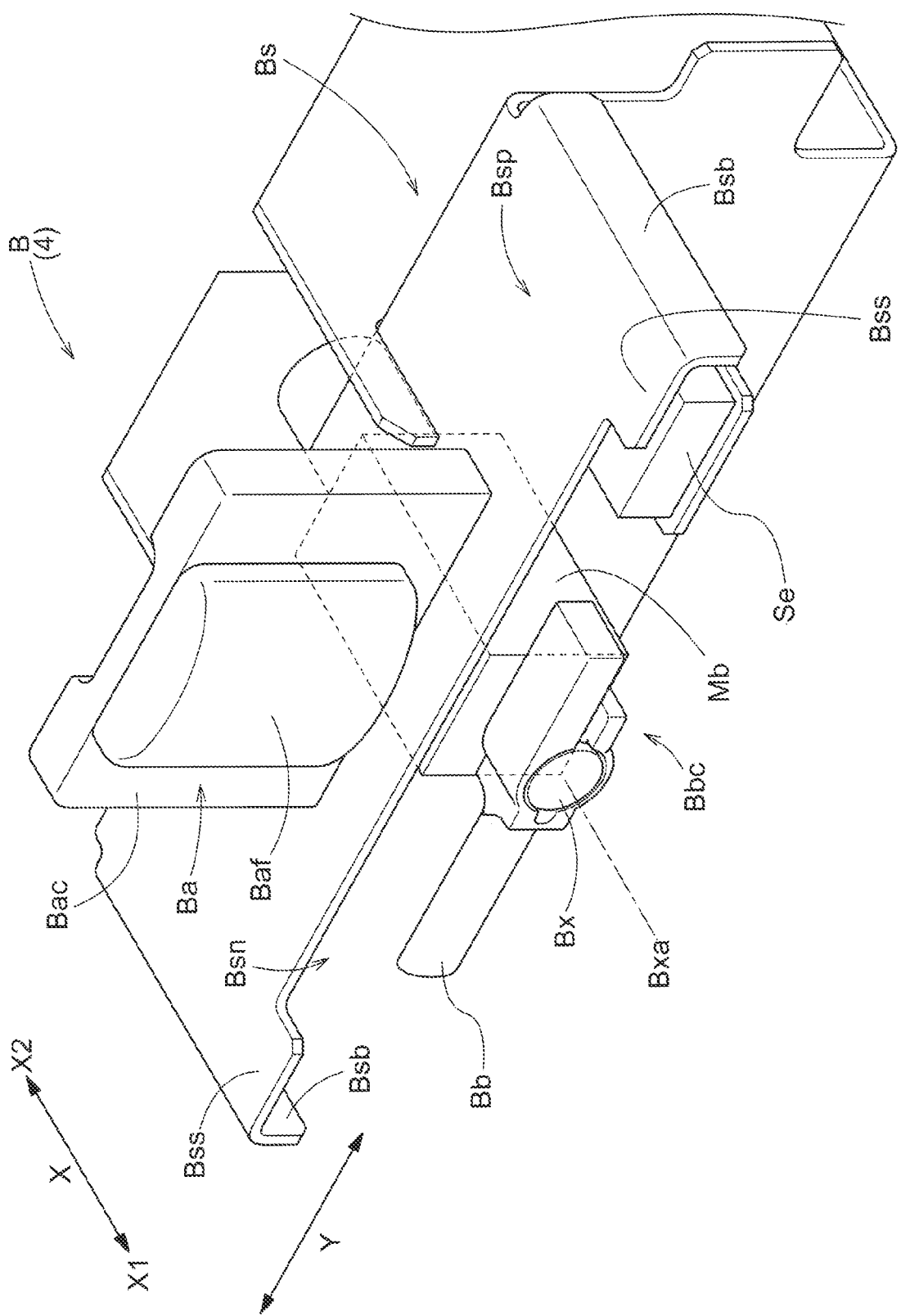
FIG. 9 is a perspective view of a main part of a transfer machine.

FIG. 9 is a perspective view of a main part of the transfer machine B. The structure of the main part is common to the first transfer machine 41B and the second transfer machine 42B.

The pusher Ba and the lockable portion Bb are supported by the support member Bs, as shown in FIG. 9. In this example, the support member Bs is a plate-like member, and includes a body portion Bsp extending along a horizontal plane, and side edge portions Bsb extending downward from both side edges, in the width direction Y, of the body portion Bsp.

The support member Bs in the present embodiment has a cutout portion Bsn, which is formed by cutting out, toward the pick-up side X2 in the transfer direction, an edge of the body portion Bsp on the delivery side X1 in the transfer direction. In this example, the cutout portion Bsn extends over a predetermined area in the width direction Y, and has a center at a middle portion, in the width direction Y, of the body portion Bsp. Here, the length in the width direction Y of the cutout portion Bsn is larger than the length in the transfer direction X.

Portions of the body portion Bsp on both outer sides, in the width direction Y, of the cutout portion Bsn protrude toward the delivery side X1 in the transfer direction. This pair of protrusion portions serves as the supporters Bss that support a container 70 from below during the pick-up operation. The supporters Bss support the supported face 74f formed on the transfer rib portion 74 from below during the pick-up operation (see FIG. 12). The transfer device 4 in the present embodiment thus has the supporters Bss that support the supported face 74f from below.

The pusher Ba pushes a container 70 toward the delivery side X1 in the transfer direction during the delivery operation. The pusher Ba is arranged at a middle portion, in the width direction Y, of the support member Bs. In the present embodiment, the pusher Ba is arranged above the body portion Bsp of the support member Bs. The pusher Ba in the shown example is supported by the support member Bs by being joined to a pusher joint section Bac, which stands upward on the body portion Bsp. The pusher Ba is arranged on the delivery side X1 in the transfer direction relative to the pushing joint section Bac.

The pusher Ba has a contact face Baf that comes into contact with a middle portion, in the width direction Y, of the container rear face portion Ba during the delivery operation. The contact face Baf in the present embodiment comes into contact with the locking wall portion 76 of a container 70 from the pick-up side X2 in the transfer direction during the delivery operation (see FIG. 14). The contact face Baf in this example is a curved face protruding toward the delivery side X1 in the transfer direction (see FIG. 15). More specifically, it is preferable that the contact face Baf is curved to protrude toward the delivery side X1 in the transfer direction as viewed in the vertical direction, and is a curved face that is vertically straight as viewed in the width direction Y. This configuration allows the contact face Baf to appropriately come into contact with a container 70 even if the container 70 inclines in a direction of rotation about a vertical axis, and makes it difficult for the contact face Baf to exert a force in the vertical direction on the container 70 while the pusher Ba is pushing the container 70, even if the container rear face portion 70R is uneven as in this example. Note that the contact face Baf in the shown example has a partial cylindrical shape that is a part of a cylindrical shape with an axis extending in the vertical direction.

The lockable portion Bb is locked to the container 70 and pulls this container 70 toward the pick-up side X2 in the transfer direction during the pick-up operation. The lockable portion Bb can change in orientation between a locking orientation (see FIG. 11) in which the lockable portion Bb is insertable into the recessed portion 75 of the container 70, and a non-locking orientation (see FIG. 10) in which the lockable portion Bb is outside the recessed portion 75, by being driven to rotate by the lock drive unit Mb.

The lockable portion Bb in the present embodiment is joined to a rotating shaft Bx that is arranged below the body portion Bsp of the support member Bs. The rotating shaft is arranged in the transfer direction X, and is driven to rotate about an axis extending in the transfer direction X by the lock drive unit Mb. The lock drive unit Mb is arranged below the body portion Bsp of the support member Bs, and is fixed to the support member Bs. The lockable portion Bs is thus supported by the support member Bs via the rotating shaft Bx and the lock drive unit Mb. The lockable portion Bb rotates about an axis extending in the transfer direction X according to the rotation of the rotating shaft Bx. Accordingly, the axis of the rotation shaft Bs corresponds to the rotation axis Bxa of the lockable portion Bb.

The lockable portion Bb in the present embodiment changes the orientation thereof between the aforementioned locking orientation and non-locking orientation by rotating about the rotation axis Bxa. The lockable portion Bb, when in the locking orientation, partially protrudes upward of the body portion Bsp of the support member Bs (see FIG. 11). The lockable portion Bb, when in the non-locking orientation, is arranged entirely below the body portion Bsp of the support member Bs (see FIG. 10).

The lockable portion Bb in the present embodiment is arranged on the delivery side X1 in the transfer direction relative to the pusher Ba. The positional relationship in the transfer direction X between the lockable portion Bb and the pusher Ba is fixed. In this example, the cutout portion Bsn is provided such that the lockable portion Bb will not interfere with the support member Bs even if the lockable portion Bb changes the orientation thereof between the locking orientation and the non-locking orientation. Here, the lockable portion Bb is arranged in the area of the cutout portion Bsn as viewed in the vertical direction in such a manner as not to overlap the support member Bs as viewed in the vertical direction. Providing this type of cutout portion Bsn enables the arrangement in the transfer direction X of the lockable portion Bb to be flexibly set relative to the support member Bs. As a result, the positional relationship between the lockable portion Bb and the pusher Ba can thus be set appropriately.

The lockable portion Bb in the present embodiment has a bar shape or a band shape extending in a direction orthogonal to the rotation axis Bxa. The lockable portion Bb in the shown example has a bar shape. In this example, the lockable portion Bb, when in the locking orientation, is positioned at a middle portion, in the width direction Y, of the container rear face portion 70R. This configuration enables the lockable portion Bb to be disposed at an appropriate position relative to the recessed portion 75 arranged at the middle portion, in the width direction Y, of the container rear face portion 70R.

The transfer device 4 uses the lockable portion Bb and the supporters Bss during the operation to pick up a container 70 from the stacking region 2A. As mentioned above, the lockable portion Bb is locked to the container 70 and pulls this container 70 toward the pick-up side X2 in the transfer direction during the pick-up operation. Further, the supporters Bss lift the container rear face portion 70R while supporting, from below, the supported face 74f formed on the transfer rib portion 74 during the operation to pick up the container 70 from the stacking region 2A (see FIG. 13). It is thereby possible to cancel the fit between the container 70 to be picked up and the container 70 arranged immediately below this container 70 to be picked up in the staking region 2A. The transfer drive unit Ms (see FIG. 8) in the present embodiment causes the lockable portion Bb and the supporters Bss to integrally reciprocate in the transfer direction X. The transfer device 4 also has the transfer elevator drive unit 40M (see FIG. 5) for raising and lowering the supporters Bss. The transfer device 4 performs the operation to pick up a container 70 from the stacking region 2A (see FIG. 13) by moving the lockable portion Bb and the supporters Bss in the transfer direction X with use of the transfer drive unit Ms and raising and lowering (raising) the supporters Bss with use of the transfer elevator drive unit 40M. Note that the transfer elevator drive unit 40M raises and lowers the entire transfer machine B by raising and lowering the transfer elevator 40B along the transfer mast 40, as mentioned above with reference to FIG. 5. Thus, the transfer elevator drive unit 40M raises and lowers the supporters Bss in conjunction with raising and lowering the entire transfer machine B. In the present embodiment, the transfer elevator drive unit 40M corresponds to a "raising-lowering drive unit".

The transfer device 4 uses the pusher Ba and the supporters Bss during the operation to deliver a container 70 to the stacking region 2A. The pusher Ba pushes the container 70 toward the transfer-direction delivery side X1 during the delivery operation, as mentioned above. Further, the supporters Bss lower the container rear face portion 70R while supporting, from below, the supported face 70f formed on the transfer rib portion 74 during the operation to deliver the container 74 to the stacking region 70A (see FIG. 16). The container 70 to be delivered can thus be fitted to a container 70 in the stacking region 2A from above. The transfer drive unit Ms (see FIG. 8) in the present embodiment causes the pusher Ba and the supporters Bss to integrally reciprocate in the transfer direction X. The transfer device 4 performs the operation to deliver the container 40 to the stacking region 2A (see FIG. 16) by moving the pusher Ba and the supporters Bss in the transfer direction X with use of the transfer drive unit Ms and raising and lowering (lowering) the supporters Bss with use of the transfer elevator drive unit 40M (see FIG. 16). Note that the pusher Ba is supported together with the lockable portion Bb by the support member Bs, as mentioned above. Accordingly, the transfer drive unit Ms in the present embodiment causes the pusher Ba, the lockable portion Bb, and the supporters Bss to integrally reciprocate in the transfer direction X.

The support member Bs in the present embodiment has a detector Se for detecting the relative position of the lockable portion Bb with respect to a container 70. The detector Se in this example is joined to the body portion Bsp by a joint member, such as a bracket, below the body portion Bsp of the support member Bs. The detector Se is configured as an optical sensor that projects light to a target. However, the detector Se is not limited to this configuration, and may alternatively be configured using any known means, such as an ultrasonic sensor or a camera.

Figure 10:
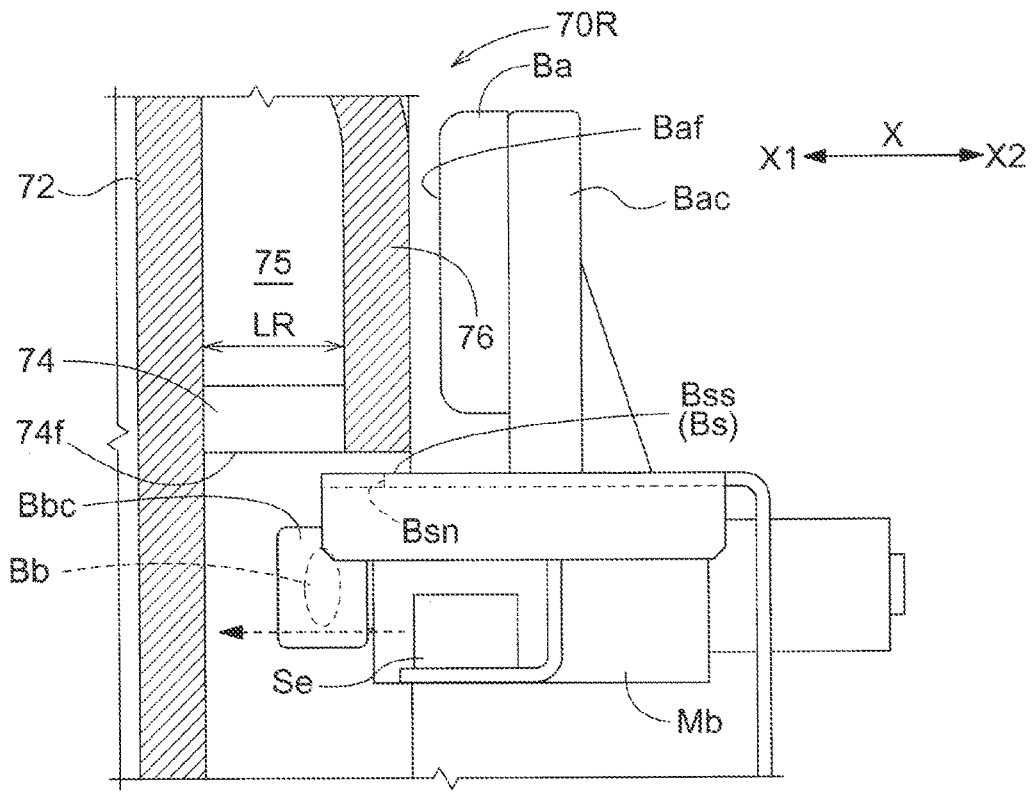
FIG. 10 illustrates a pick-up operation performed by the transfer device.

The detector Se detects that the relative position of the lockable portion Bb with respect to a container 70 is in a lockable range LR, as shown in FIG. 10. The lockable range LR is a range of relative positions of the lockable portion Bb with respect to a container 70 at which the lockable portion Bb is positioned in the recessed portion 75 of the container 70, which is located on the delivery side X1 in the transfer direction X relative to the locking wall portion 76 of the container 70, while the lockable position Bb is in the locking orientation. Accordingly, when the lockable portion Bb is in the lockable range LR, the lockable portion Bb is at least partially inserted in the recessed portion 75 if the lockable portion Bb is in the locking orientation, and the lockable portion Bb is positioned immediately below the recessed portion 75 if the lockable portion Bb is in the non-locking orientation. That is, the lockable portion Bb is regarded as being arranged in the lockable range LR if the lockable portion Bb is not inserted in the recessed portion 75 but is arranged immediately below the recessed portion 75. Therefore, the lockable range LR is set as an area corresponding to the separation distance in the transfer direction X between the peripheral wall portion 72 and the locking wall portion 76 of a container 70. In other words, the lockable range LR is set as an area corresponding to the length in the transfer direction X of the recessed portion 75. Thus, the lockable range LR is an area set in the transfer direction X. Note that "immediately below the recessed portion 75" means a position below the recessed portion 75 of a container 70 and overlapping the recessed portion 75 as viewed in the vertical direction.

The lockable portion Bb in the present embodiment changes the orientation thereof from the non-locking orientation to the locking orientation if the detector Se detects that the lockable portion Bb is located in the lockable range LR. That is, the lockable portion Bb can change in orientation between the locking orientation in which the lockable portion Bb is insertable in the recessed portion 75 of a container 70 and the non-locking orientation in which the lockable portion Bb is outside the recessed portion 75, by being driven to rotate by the lock drive unit Mb when the relative position of the lockable portion Bb with respect to the container 70 is in the predetermined lockable range LR.

Pick-Up Operation

Next, a description will be given of the delivery operation, namely the operation to pick up a container 70 performed by the transfer device 4, with reference to FIGS. 10 to 13. Note that FIGS. 10 to 13 show the operation to pick up a container 70 from the stacking region 2A where a plurality of containers 70 are stacked.

The transfer device 4 arranges the lockable portion Bb in the non-locking orientation in the lockable range LR, as shown in FIG. 10, while performing the pick-up operation. The transfer device 4 in the present embodiment arranges the lockable portion Bb in the lockable range LR by integrally moving the pusher Ba, the lockable portion Bb, and the supporters Bss toward the delivery side X1 in the transfer direction. The transfer drive 4 moves the pusher Ba, the lockable portion Bb, and the supporters Bss toward the delivery side X1 in the transfer direction by driving the support member Bs with use of the transfer drive unit Ms. The transfer device 4 determines whether or not the lockable portion Bb has been arranged in the lockable range LR, based on the result of detection by the detector Se. Note that the supporters Bss are arranged at positions opposing the supported face 74f of the transfer rib portion 74 from below, with the lockable portion Bb being in the lockable range LR.

Figure 11:
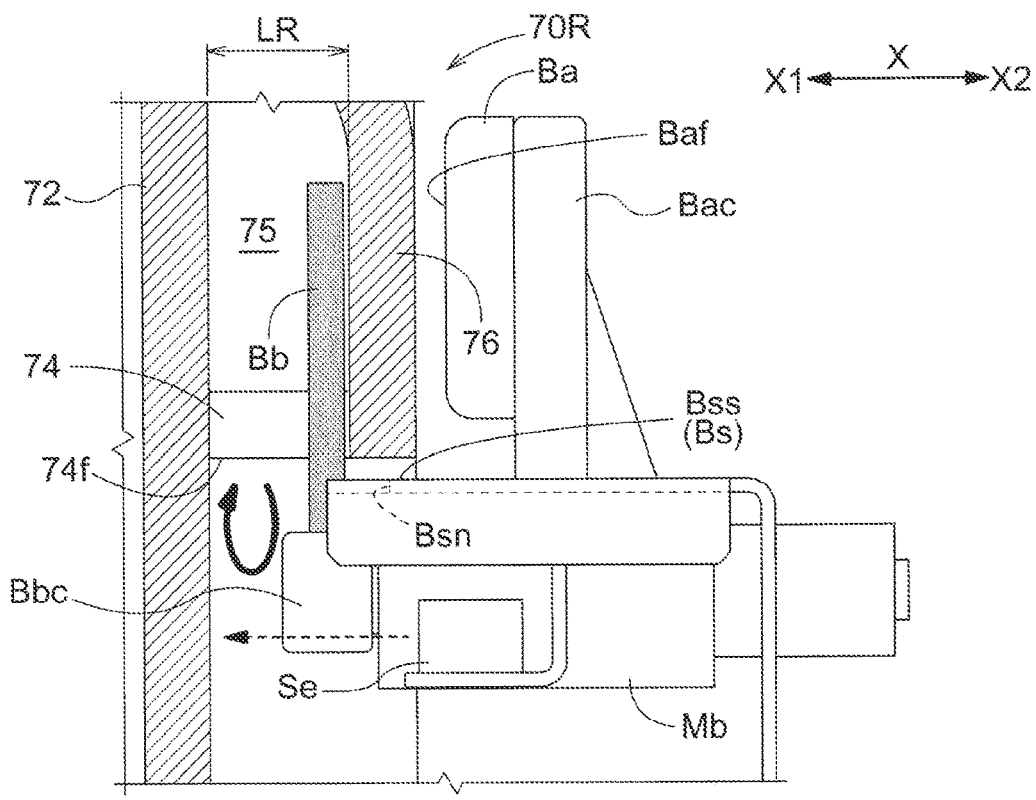
FIG. 11 illustrates the pick-up operation performed by the transfer device.

The transfer device 4 changes the orientation of the lockable portion Bb from the non-locking orientation to the locking orientation as shown in FIG. 11 if the detector Se detects that the lockable portion Bb has been arranged in the lockable range LR. The transfer device 4 changes the orientation of the lockable portion Bb by driving the lockable portion Bb with use of the lock drive unit Mb. When the lockable portion Bb is in the locking orientation, the lockable portion Bb and the pusher Ba are arranged on respective sides in the transfer direction X of the locking wall portion 76 of the container 70, as shown in FIG. 11.

Figure 12:
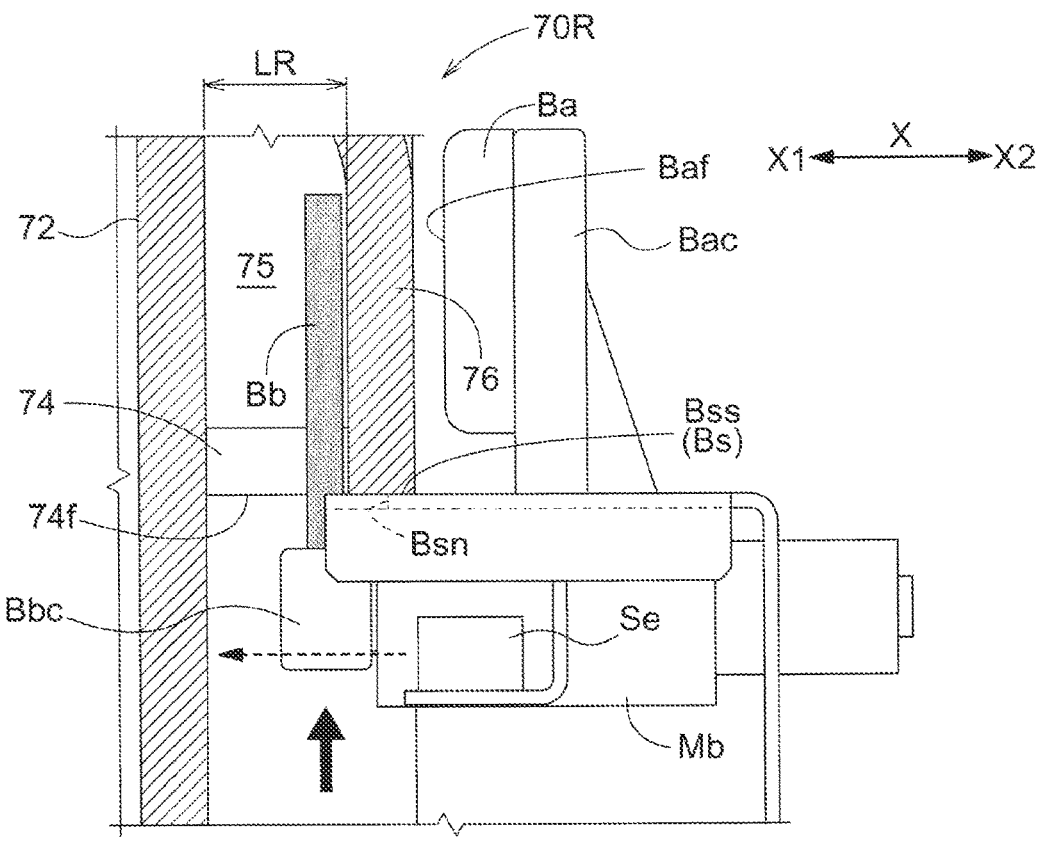
FIG. 12 illustrates the pick-up operation performed by the transfer device.
Figure 13:
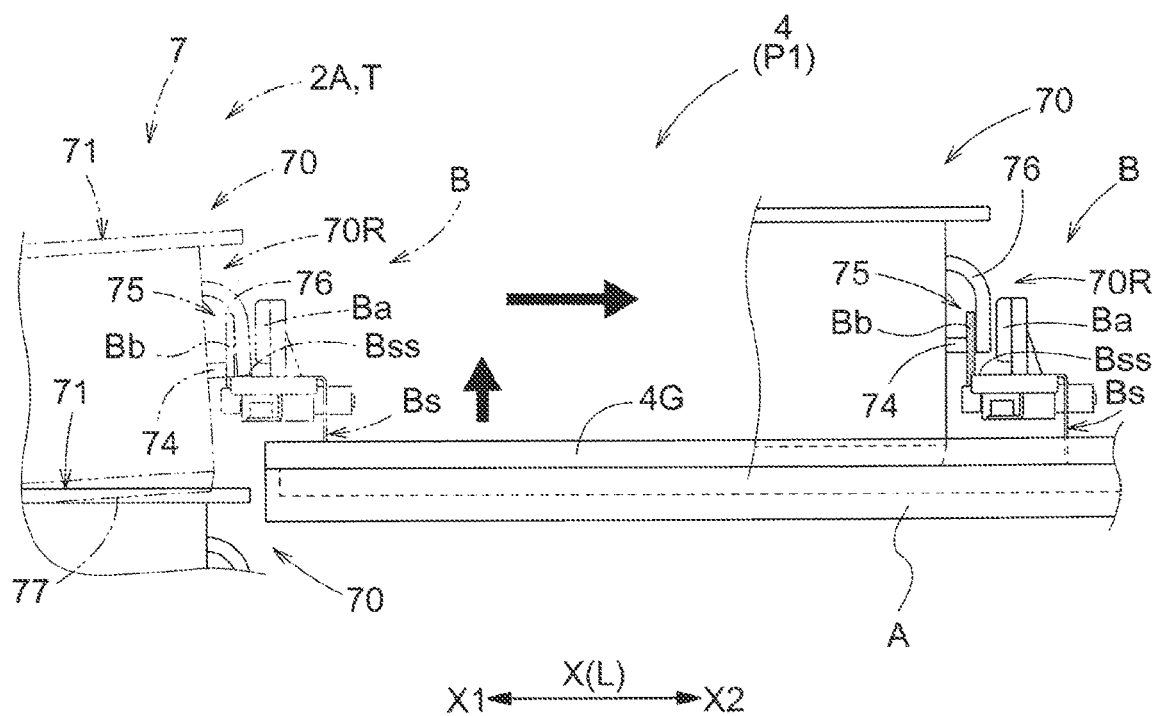
FIG. 13 illustrates the pick-up operation performed by the transfer device.

The transfer device 4 lifts the transfer rib portion 74 with use of the supporters Bss by raising the supporters Bss arranged at the positions opposing the supported face 74f of the transfer rib portion 74 from below, as shown in FIG. 12. The container rear face portion 70R is thus raised, and the fit between the container 70 to be picked up and the container 70 arranged immediately below the container 70 to be picked up is canceled, as shown in FIG. 13. Specifically, an end portion, on the pick-up side X2 in the transfer direction, of the fitting portion 77 of the container 70 to be picked up is separated upward from the opening portion 71 of the container 70 arranged immediately below the container 70 to be picked up. The transfer device 4 then pulls the container 70 toward the pick-up side X2 in the transfer direction by moving the lockable portion Bb toward the pick-up side X2 in the transfer direction. In the present embodiment, the transfer device 4 moves the lockable portion Bb toward the pick-up side X2 in the transfer direction by integrally moving the pusher Ba, the lockable portion Bb, and the supporters Bss toward the pick-up side X2 in the transfer direction. That is, the transfer device 4 performs the operation to pick up the container 70 by moving the lockable portion Bb in the locking orientation toward the pick-up side X2 in the transfer direction with use of the transfer drive unit Ms.

The operation to pick up the container 70 is performed as described above. The pick-up operation is performed by the control device C (see FIG. 5) controlling the functional units of the transport apparatus 100. Note that the above is a description of the operation to pick up a container 70 when the stacking region 2A is the transfer target location T. However, the pick-up operation is performed almost similarly when a shelf section 80 of a container rack 8 is the transfer target location T as well. Meanwhile, the supporters Bss need not necessarily be raised and lowered when the operation to pick up a container 70 in a shelf section 80, since the fit between containers 70 need not be canceled.

Delivery Operation

Next, a description will be given of the delivery operation, namely the operation to deliver a container 70 performed by the transfer device 4, with reference to FIGS. 14 to 16. Note that FIGS. 14 to 16 show the operation to deliver a container 70 to the stacking region 2A where a plurality of containers 70 are stacked.

Figure 14:
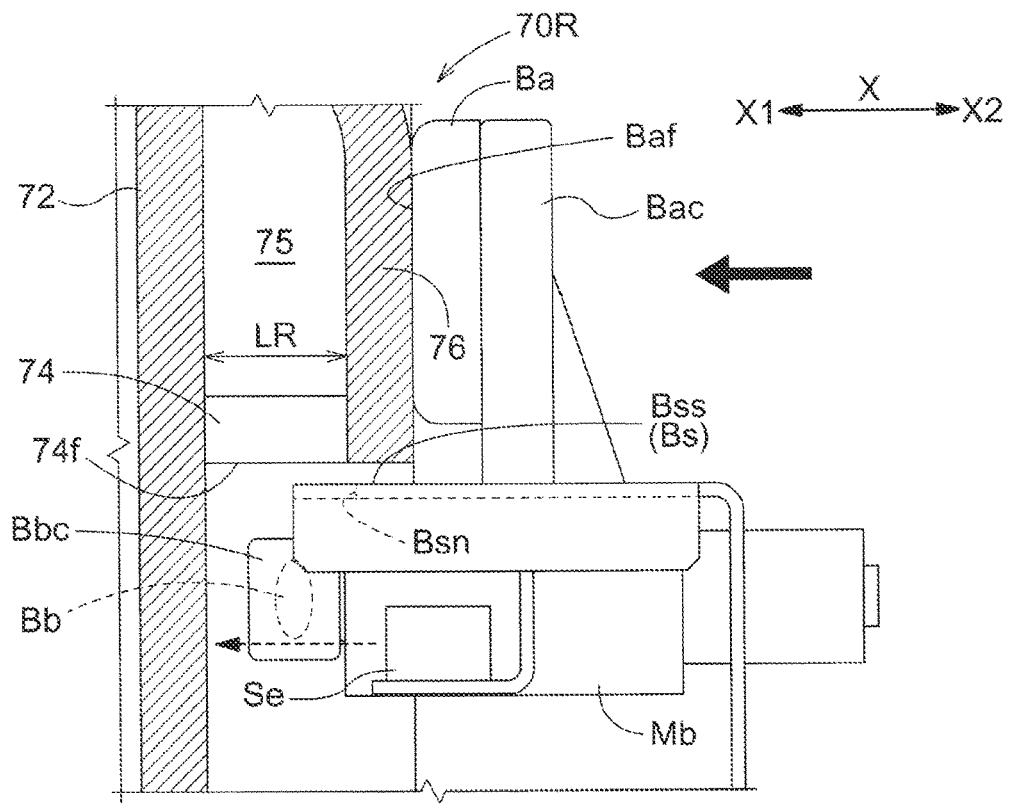
FIG. 14 illustrates a delivery operation performed by the transfer device.
Figure 15:
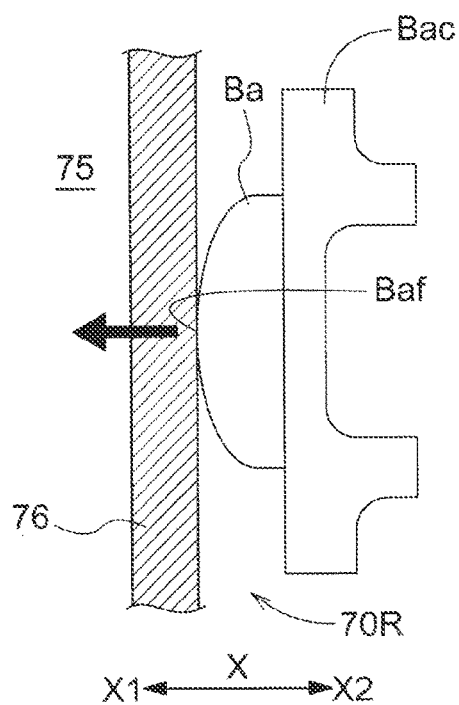
FIG. 15 illustrates the delivery operation performed by the transfer device.

The transfer device 4 brings the pusher Ba into contact with the container rear face portion 70R and pushes the container 70 toward the delivery side X1 in the transfer direction with use of the pusher, as shown in FIG. 14, while performing the delivery operation. The transfer device 4 in this example brings the pusher Ba into contact with the locking wall portion 76 of the container 70 and pushes the container 70. The curved contact face Baf of the pusher Ba in this example comes into contact with the container rear face portion 70R, more specifically the locking wall portion 76, as shown in FIG. 15.

The positional relationship in the transfer direction X between the lockable portion Bb and the pusher Ba is fixed in the present embodiment, as mentioned above. In this example, the positional relationship between the lockable portion Bb and the pusher Ba is set such that the lockable range Bb is positioned in the lockable range LR with the pusher Ba being in contact with the locking wall portion 76 from the pick-up side X2 in the transfer direction, as shown in FIG. 14. The supporters Bss are arranged at positions opposing the supported face 74f of the transfer rib portion 74 from below with the pusher Ba being in contact with the locking wall portion 76 from the pick-up side X2 in the transfer direction and with the lockable portion Bb being located in the lockable range LR.

Figure 16:
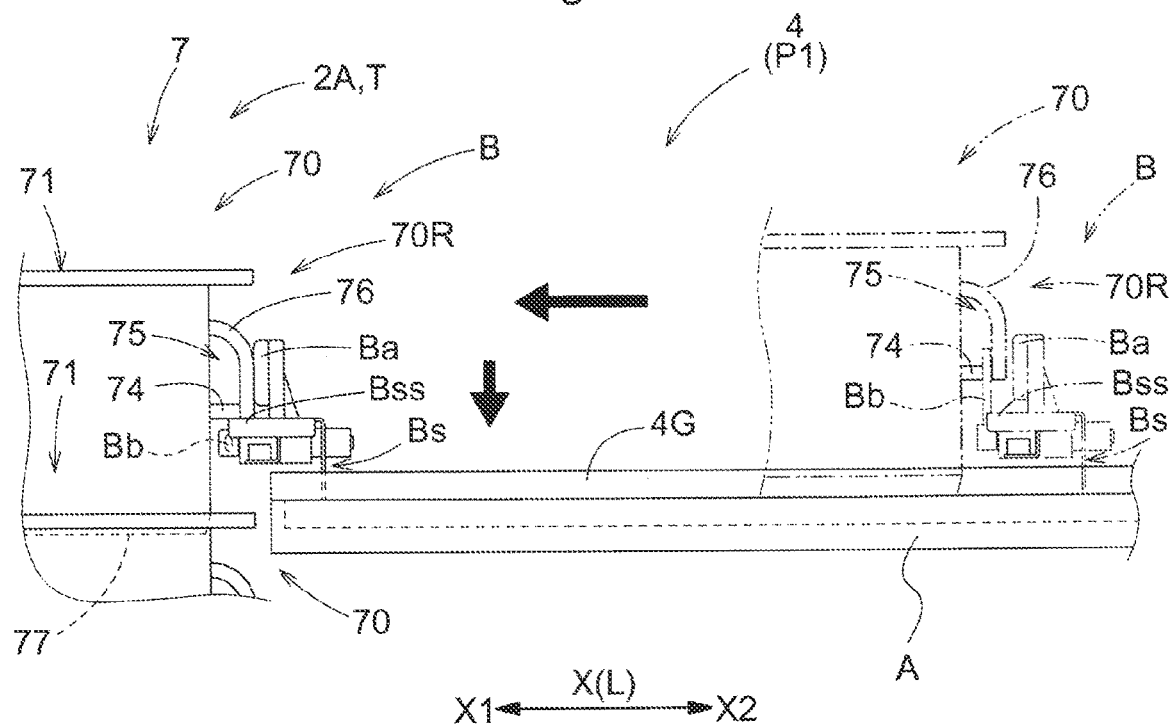
FIG. 16 illustrates the delivery operation performed by the transfer device.

The transfer device 4 performs the operation to deliver the container 70 by moving the pusher Ba in contact with the locking wall portion 76 (container rear face portion 70R) toward the delivery side X1 in the transfer direction with use of the transfer drive unit Ms, as shown in FIG. 16. The transfer device 4 in the present embodiment pushes the container 70 toward the delivery side X1 in the transfer direction with use of the pusher Ba by integrally moving the pusher Ba, the lockable portion Bb, and the supporters Bss toward the delivery side X1 in the transfer direction. The transfer device 4 in this example pushes the container 70 to be delivered toward the delivery side X1 in the transfer direction at a position above the container 70 serving as the delivery destination in the stacking region 2A. After the container 70 to be delivered protrudes toward the delivery side X1 in the transfer direction relative to the holder A to lose the support by the holder A and moves downward in the stacking region 2A, the transfer device 4 enters a state of supporting the supported face 74f of the transfer rib portion 74 with use of the supporters Bss. Thus, the container rear face portion 70R of the container 70 to be delivered is supported by the supporters Bss. Thereafter, the supporters Bss are lowered, thereby causing the container 70 to be delivered to fit to the container 70 serving as the delivery destination from above. The container 70 to be delivered is thus stacked in the stacking region 2A.

The operation to delivery the container 70 is performed as described above. The delivery operation is performed by the control device C (see FIG. 5) controlling the functional units of the transport apparatus 100. Note that the above is a description of the operation to deliver the container 70 when the stacking region 70A is the transfer target location T. However, the delivery operation is performed almost similarly when a shelf section 8 of a container rack 80 is the transfer target location T as well. Meanwhile, the supporters Bss need not necessarily be raised and lowered when the operation to deliver the container 70 to a shelf section 70, since containers 70 need not be fitted.

Next, a detailed description will be given of the transfer operation, namely the operation to transfer a container 70 performed by the transfer device 4, with reference to FIGS. 17 to 29. Note that FIGS. 17 to 29 show only the elements necessary for describing the transfer operation in a simplified manner.

Operation to Pick Up Container from Shelf Section

The transfer device 4 in the present embodiment performs the operation to pick up a container 70 from a shelf sections 80 of a container rack 8. The following is a description of the operation to pick up a container 70 from a shelf section 80, with reference to FIGS. 17 to 22. FIGS. 17 to 22 show the first lockable portion 41Bb and the second lockable portion 42Bb in the locking orientation in gray, and show the first lockable portion 41Bb and the second lockable portion 42Bb in the non-locking orientation in white. Here, a description will be given of an example of picking up a container 70 stored in a shelf section 80 with use of the first transfer machine 41B. Note that the same applies to the case of performing the pick-up operation with use of the second transfer machine 42B.

Figure 17:
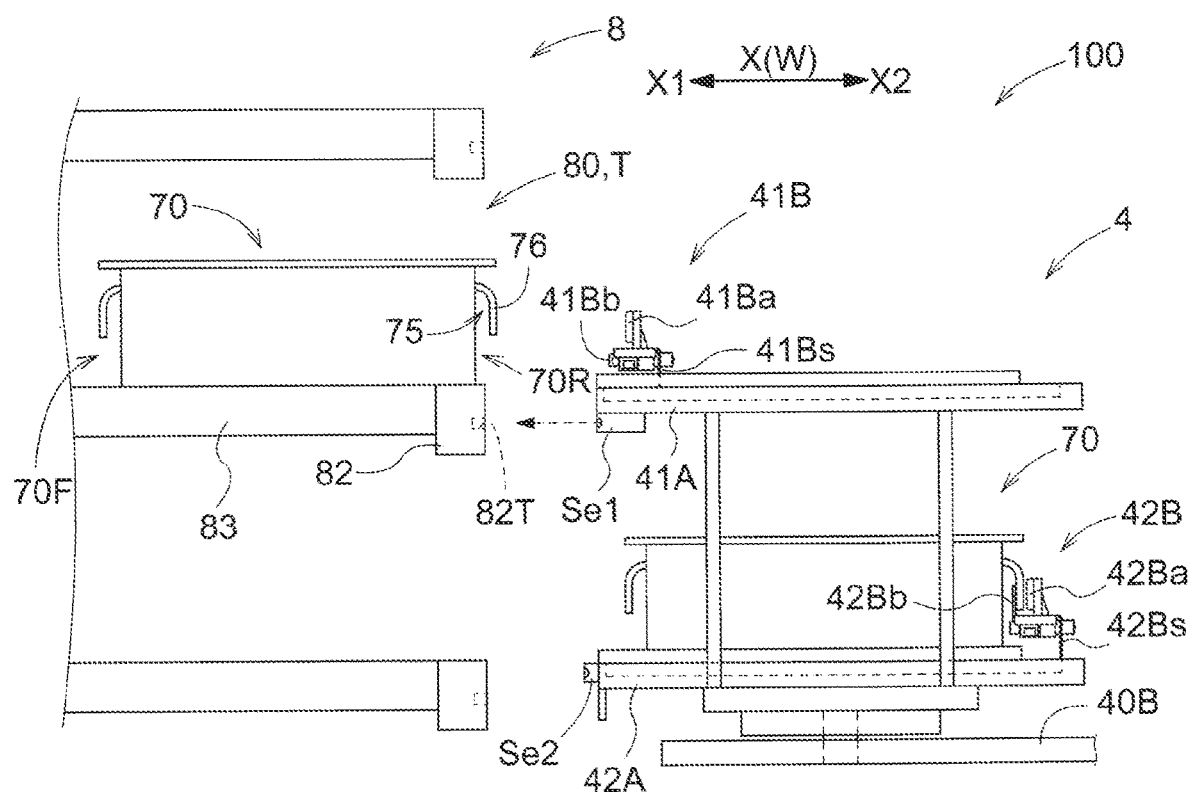
FIG. 17 illustrates an operation to pick up a container from the shelf section.
Figure 18:
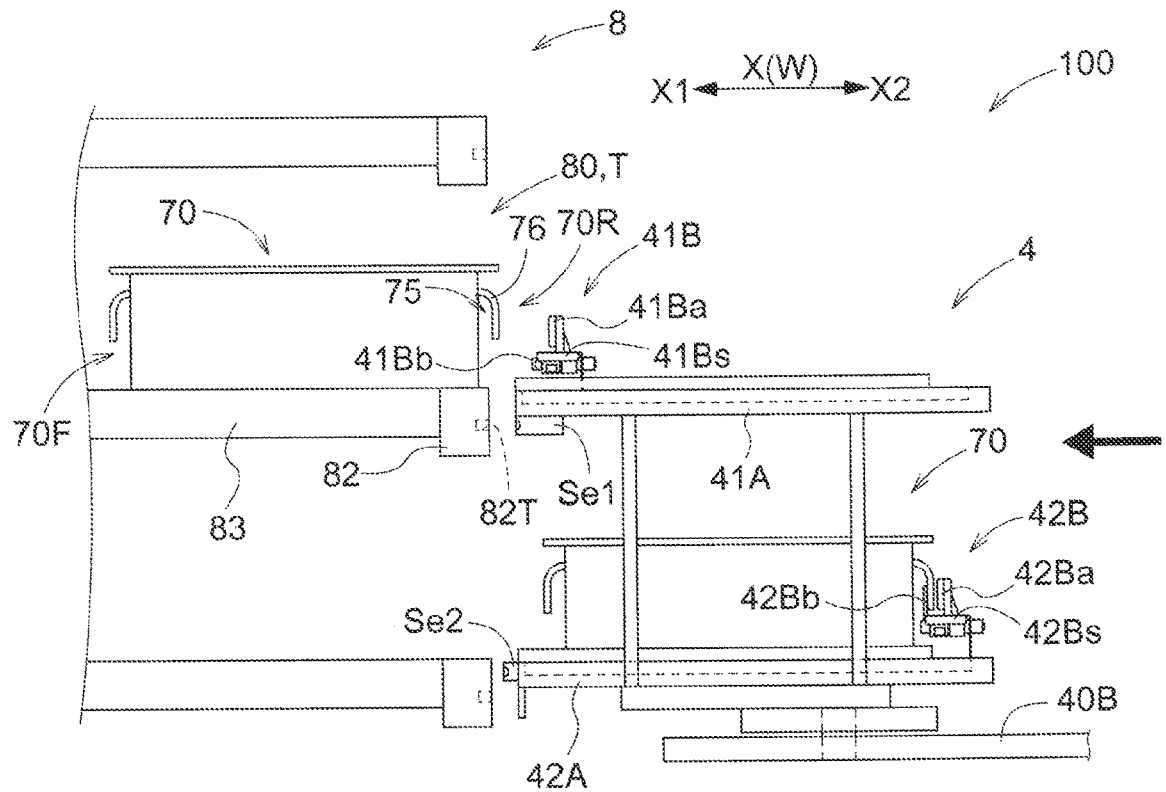
FIG. 18 illustrates the operation to pick up a container from the shelf section.

The control device C (see FIG. 5) aligns the first transfer machine 41B at an appropriate position relative to a reference position 80P in the shelf section 80 as shown in FIG. 17, based on the result of the reference position detection sensor Se1 detecting a target point 82T. Note that the transport apparatus 100 may also have an angle sensor for detecting the angle of the first transfer machine 41B in a horizontal plane. In this case, the angle sensor detects the angle of the first transfer machine 41B relative to the shelf section 80. The control device C then sets the first transfer machine 41B at an appropriate angle relative to the shelf section 80, based on the result of detection by the angle sensor. The control device C adjusts the position and the angle of the first transfer machine 41B by controlling the traveling body 1, the turning device 5, and the transfer elevator drive unit 40M of the transfer device 4. The control device C starts the operation to pick up the container stored in the shelf section 80 with use of the first transfer machine 41B if the positional relationship between the first transfer machine 41B and the shelf section 80 is appropriate. The control device C relatively moves the first holder 41A and the second holder 42A toward the delivery side X1 in the transfer direction with respect to the transfer elevator 40B, as shown in FIG. 18. This causes the first holder 41A, the second holder 42A, the first transfer machine 41B, and the second transfer machine 42B to approach the shelf section 80. Here, the reference position detection sensor Se1, which also functions as a ranging sensor, detects the proximity distance from the shelf section 80. Accordingly, the first holder 41A, the second holder 42A, the first transfer machine 41B, and the second transfer machine 42B can be brought to a distance appropriate for performing the transfer operation from the shelf section 80.

Figure 19:
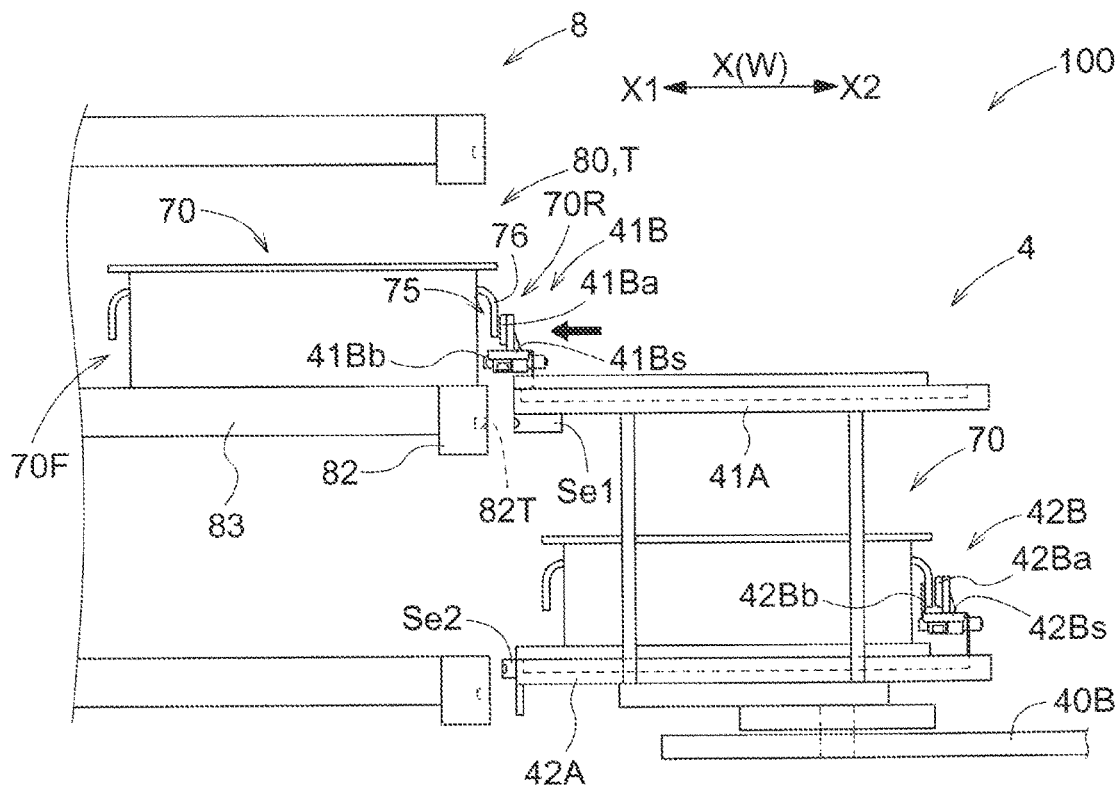
FIG. 19 illustrates the operation to pick up a container from the shelf section.

Next, the control device C relatively moves the first lockable portion 41Bb toward the delivery side X1 in the transfer direction with respect to the first holder 41A, as shown in FIG. 19. The first lockable portion 41Bb is thus arranged immediately below the recessed portion 75 of the container 70. Here, the first lockable portion 41Bb is in the non-locking orientation.

Figure 20:
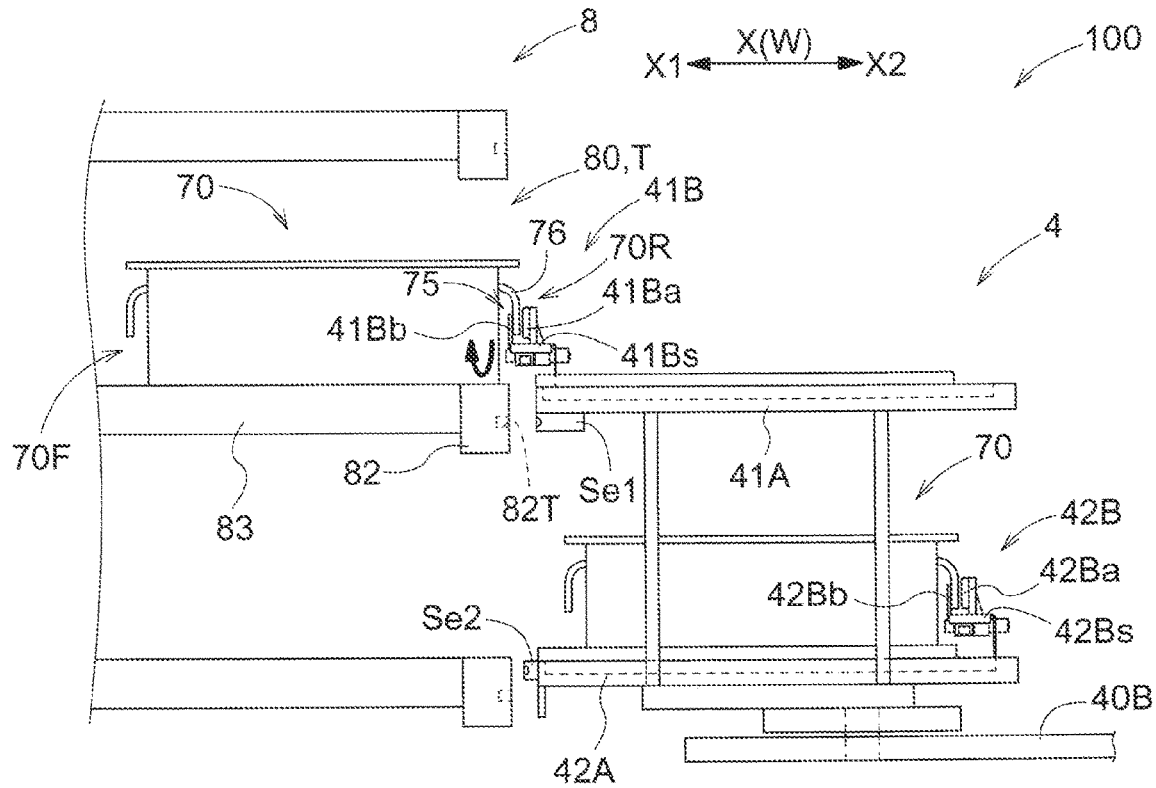
FIG. 20 illustrates the operation to pick up a container from the shelf section.

The control device C then causes the first lockable portion 41Bb arranged immediately below the recessed portion 75 to assume the locking orientation, as shown in FIG. 20. The control device C thus inserts the first lockable portion 41Bb into the recessed portion 75, and arranges the first lockable portion 41Bb on the delivery side X1 in the transfer direction relative to the locking wall portion 76 such that the first lockable portion 41Bb opposes the locking wall portion 76.

Figure 21:
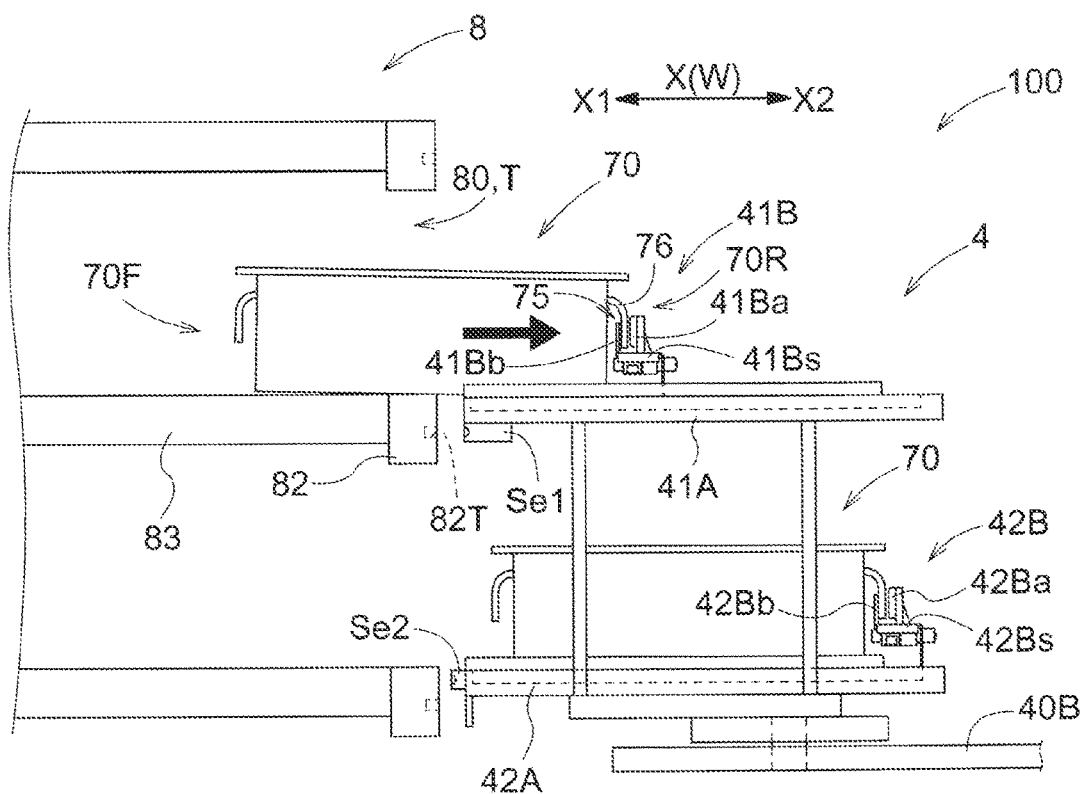
FIG. 21 illustrates the operation to pick up a container from the shelf section.

Thereafter, the control device C relatively moves the first lockable portion 41Bb in the locking orientation toward the pick-up side X2 in the transfer direction with respect to the first holder 41A, while bringing the first lockable portion 41Bb into contact with the locking wall portion 76, as shown in FIG. 21. The first lockable portion 41Bb thus pulls the container 70 stored in the shelf section 80 into the first lockable portion 41A.

Figure 22:
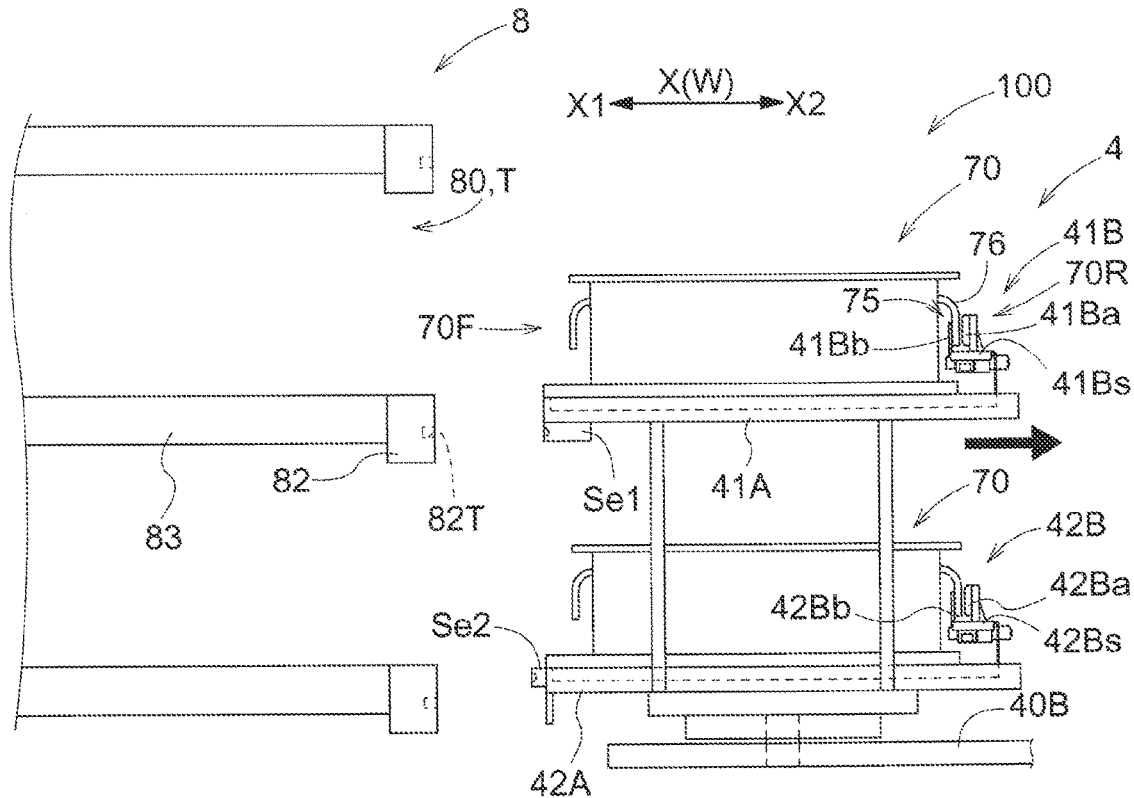
FIG. 22 illustrates the operation to pick up a container from the shelf section.

The control device C relatively moves the first holder 41A and the second holder 42A toward the pick-up side X2 in the transfer direction with respect to the transfer elevator 40B and returns the first holder 41A and the second holder 42A to the respective original positions with the first holder 41A holding the container 70 picked up by the first transfer machine 41B, as shown in FIG. 22. The first holder 41A, the second holder 42A, the first transfer machine 41B, and the second transfer machine 42B thus separate from the shelf section 80. Note that the control device C in this example maintains the first lockable portion 41Bb in the locking orientation while the first holder 41A is holding the container 70. Similarly, the control device C maintains the second lockable portion 42Bb in the locking orientation while the second holder 42A is holding the container 70. The container 70 can thus be stably held in such a manner as not to move in the transfer direction X.

Operation to Deliver Container to Shelf Section

Figure 23:
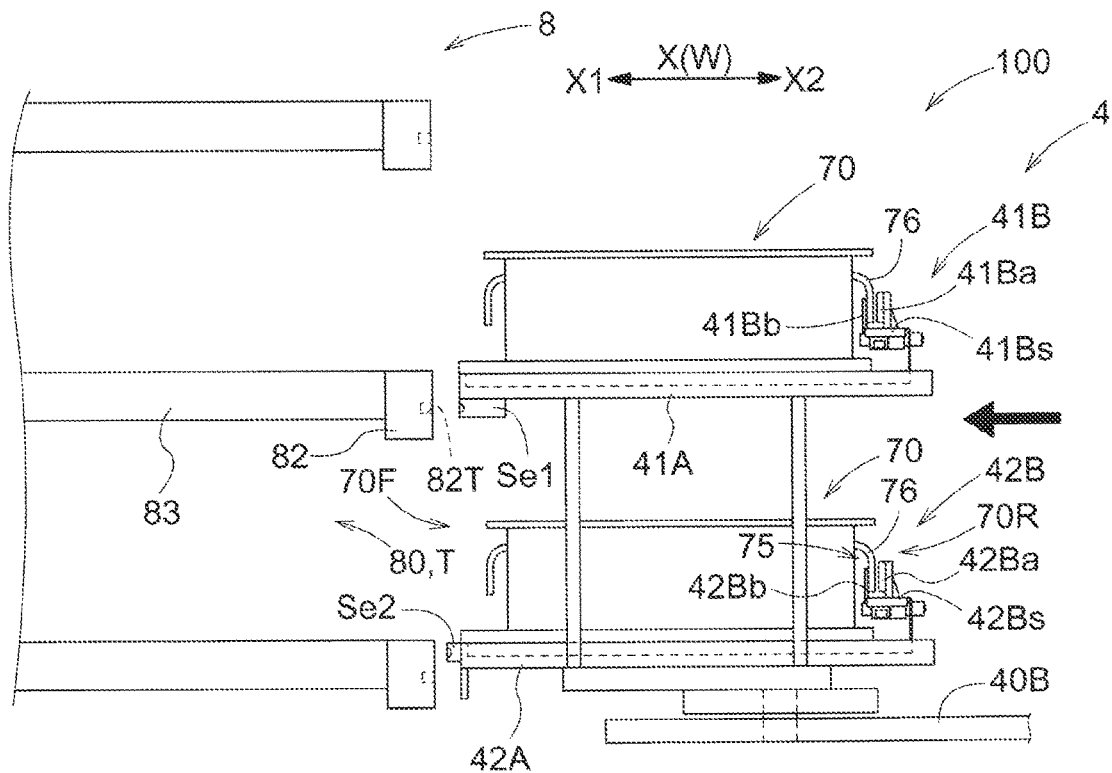
FIG. 23 illustrates an operation to deliver a container to the shelf section.
Figure 24:
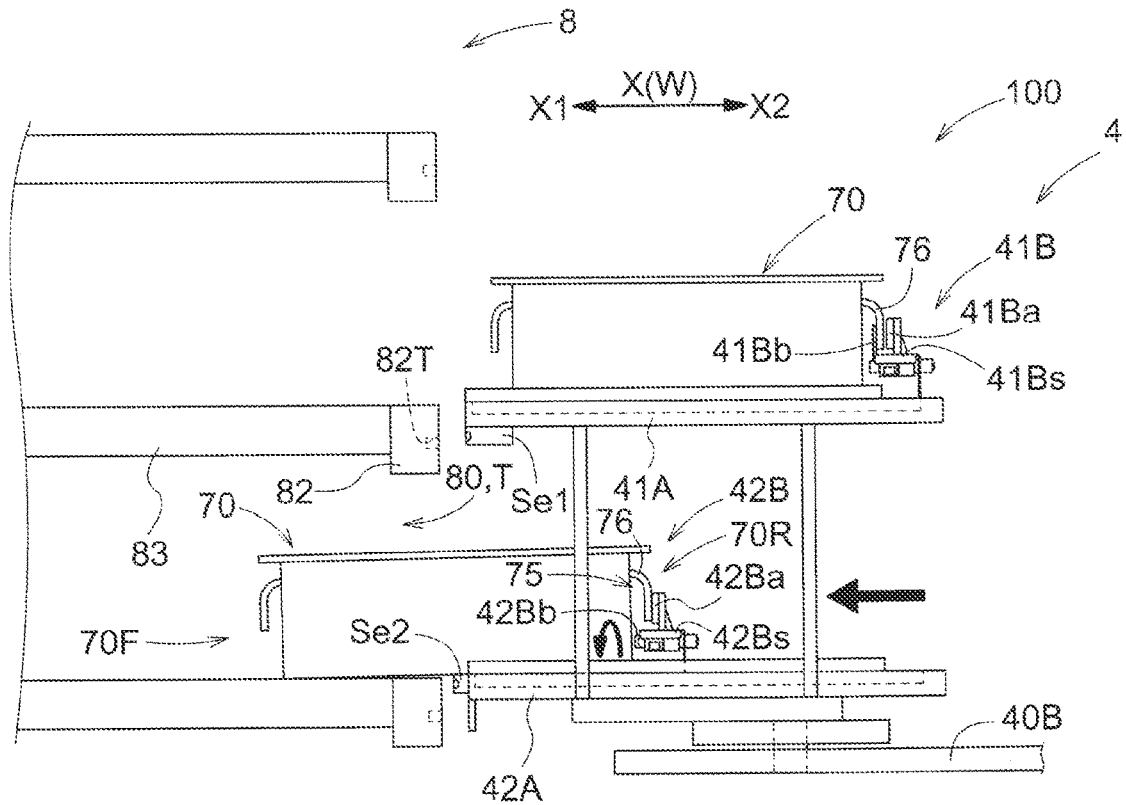
FIG. 24 illustrates the operation to deliver a container to the shelf section.
Figure 25:
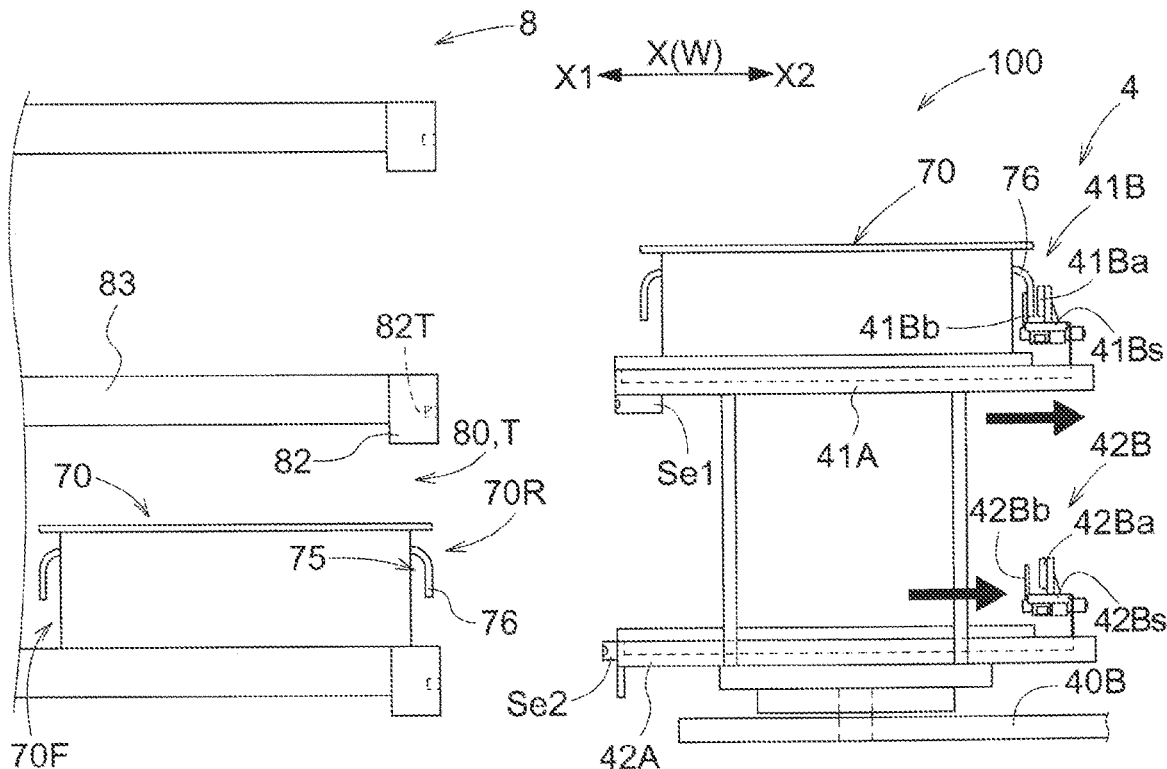
FIG. 25 illustrates the operation to deliver a container to the shelf section.

The transfer device 4 in the present embodiment performs the operation to deliver a container 8 to a shelf section 80 of a container rack 70. The following is a description of the operation to deliver a container 70 to a shelf section 80, with reference to FIGS. 23 to 25. FIGS. 23 to 25 show the first lockable portion 41Bb and the second lockable portion 42Bb in the locking orientation in gray, and show the first lockable portion 41Bb and the second lockable portion 42Bb in the non-locking orientation in white. Here, a description will be given of an example of delivering a container 70 to a shelf section 80 with use of the second transfer machine 42B. Note that the same applies to the case of performing the delivery operation with use of the first transfer machine 41B.

The present embodiment envisions the case of performing the operation to pick up a container 70 from a shelf section 80 with use of the first transfer machine 41B as described above, and performing, immediately after this pick-up operation, the operation to deliver a container 70 to a shelf section 80 immediately below the shelf section 80 from which the pick-up operation has been performed, with use of the second transfer machine 42B. Accordingly, the second transfer machine 42B is already in an appropriate positional relationship with the shelf section 80. Note that, as in the above-described operation to pick up a container 70 from a shelf section 80, the control device C may also perform a control to adjust the position of the second transfer machine 42B to achieve an appropriate positional relationship with the shelf section 80 based on, for example, the result of the reference position detection sensor Se1 detecting a target point 82T.

The control device C (see FIG. 5) then relatively moves the first holder 41A and the second holder 42A toward the delivery side X1 in the transfer direction with respect to the transfer elevator 40B, as shown in FIG. 23. This causes the first holder 41A, the second holder 42A, the first transfer machine 41B, and the second transfer machine 42B to approach the shelf section 80.

Next, the control device C relatively moves the second pusher 42Ba toward the delivery side X1 in the transfer direction with respect to the second holder 42A to push the container 70 toward the delivery side X1 in the transfer direction, as shown in FIG. 24. As a result, the container 70 to be delivered that have been held by the second holder 42A moves from the second holder 42A to the shelf section 80. The second pusher 42Ba in this example pushes the container 70 toward the delivery side X1 in the transfer direction while being in contact with the locking wall portion 76 of the container 70 from the pick-up side X2 in the transfer direction. Further, the control device C in this example switches, from the locking orientation to the non-locking orientation, the second lockable portion 42Ba that moves toward the delivery side X1 in the transfer direction together with the second pusher 42Ba while the container 70 to be delivered is moving toward the delivery side X1 in the transfer direction.

After delivering the container 70 to be delivered to the shelf section 80, the control device C relatively moves the second pusher 42Ba toward the pick-up side X2 in the transfer direction with respect to the second holder 42A, and relatively moves the first holder 41A and the second holder 42A toward the pick-up side X2 in the transfer direction with respect to the transfer elevator 40B to return the first holder 41A and the second holder 42A to the respective original positions, as shown in FIG. 25. This causes the first holder 41A, the second holder 42A, the first transfer machine 41B, and the second transfer machine 42B to separate from the shelf section 80.

Parallel Operation to Pick Up and Deliver Containers from and to Stacking Region In the present embodiment, the lift device 3 can form spaces in the vertical direction between a plurality of containers 70 stacked in the stacking region 2A, as mentioned above with reference to FIG. 7. The transfer device 4 transfers containers 70 to and from the stacking region 2A with use of these spaces.

The transfer device 4 in the present embodiment performs the operation to pick up a container 70 and the operation to deliver a container 70 from and to the stacking region 2A. Specifically, the transfer device 4 performs parallel operation, i.e., picks up and delivers containers 70 in parallel from and to the stacking region 2A. The transfer device 4 in the present embodiment performs the parallel operation with the first lift mechanism 31 and the second lift mechanism 32 lifting containers 70 in the stacking region 2A. However, the transfer device 4 can also independently perform the pick-up operation and the delivery operation from and to the stacking region 2A.

The following is a description of the parallel operation to pick and being in deliver containers 70 from and to the stacking region 2A, with reference to FIGS. 26 to 29. FIGS. 26 to 29 show the first lockable portion 41Bb and the second lockable portion 42Bb in the locking orientation in gray, and show the first lockable portion 41Bb and the second lockable portion 42Bb in the non-locking orientation in white. Further, FIGS. 26 to 29 show the first lift holders 31a of the first lift mechanism 31 and the second lift holders 32a of the second lift mechanism 32 that are in the holding orientation in gray, and show the first lift holders 31a and the second lift holders 32a that are in the non-holding orientation in white. Here, a description will be given of the case of delivering a container 70 to the stacking region 2A with use of the first transfer machine 41B and picking up a container 70 from the stacking region 2A with use of the second transfer machine 42B.

FIGS. 26 to 29 show an example where five containers 70 are stacked as a container group 7 in the stacking region 2A. In the figures, numerals "1 to 5" are assigned to the stacked containers 70 in ascending order. Also, letter "a" is assigned to the container 70 to be delivered that is held by the first holder 41A. In the following example, the container 70 (container "α") to be delivered is delivered onto a fourth container 70 (container "4") with use of the space that is formed in the vertical direction between a fifth container 70 (container "5") and the fourth container 70 (container "4") by the lift device 3. Further, a third container 70 (container "3")) is picked up with use of a space that is formed below the fourth container 70 (container "4") by the lift device 3, in parallel with the above delivery operation.

Figure 26:
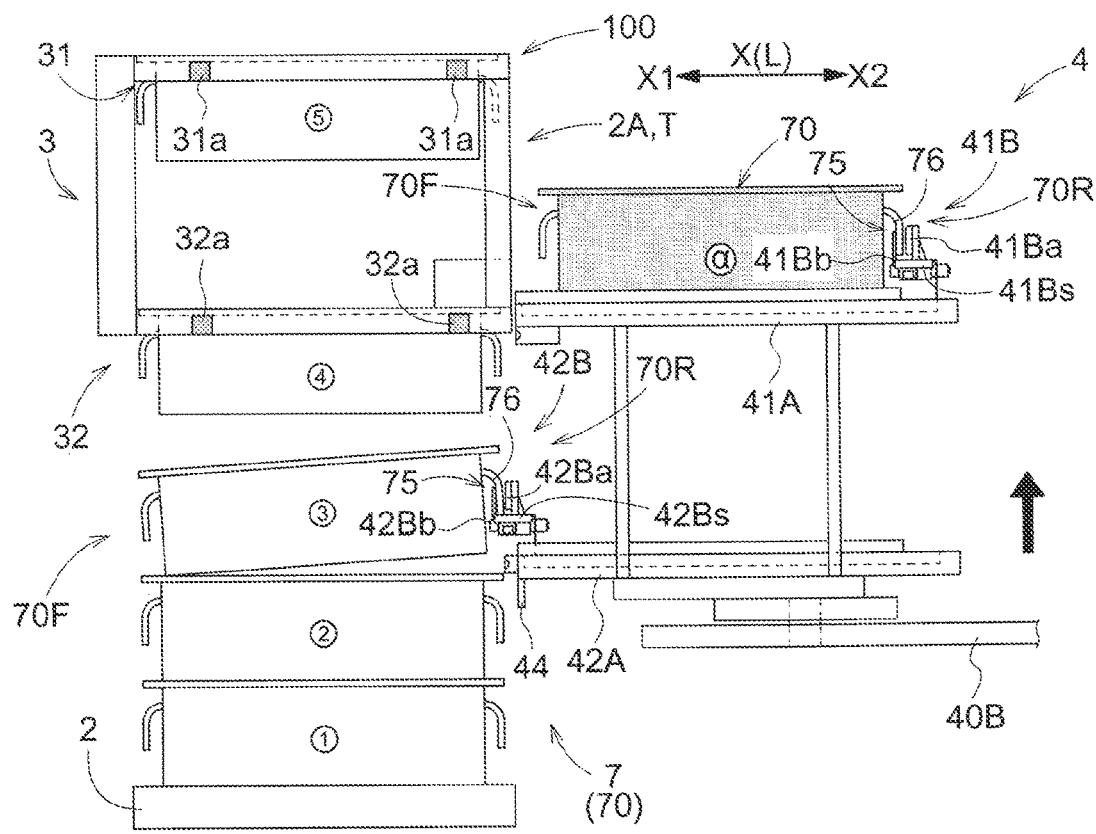
FIG. 26 illustrates parallel operations to pick up and deliver containers from and to the stacking region.

The control device C sets the second lockable portion 42Bb in the locking orientation and raises the first holder 41A and the second holder 42A, as shown in FIG. 26. The container 70 (container "3") to be picked up is thus inclined with an end portion thereof on the pick-up side X2 in the transfer direction raised, such that the fit between the container 70 (container "3") to be picked up and a container 70 (container "2") immediately below the container "3" is canceled. Thus raising the first holder 41A and the second holder 42A causes the first holder 41A to be arranged above the container 70 (container "4") lifted by the second lift holders 32a. In other words, the control device C arranges the lower face of the container 70 (container "α") to be delivered that is held by the first holder 41A, above the upper face of the container 70 (container "4") serving as the delivery destination.

Figure 27:
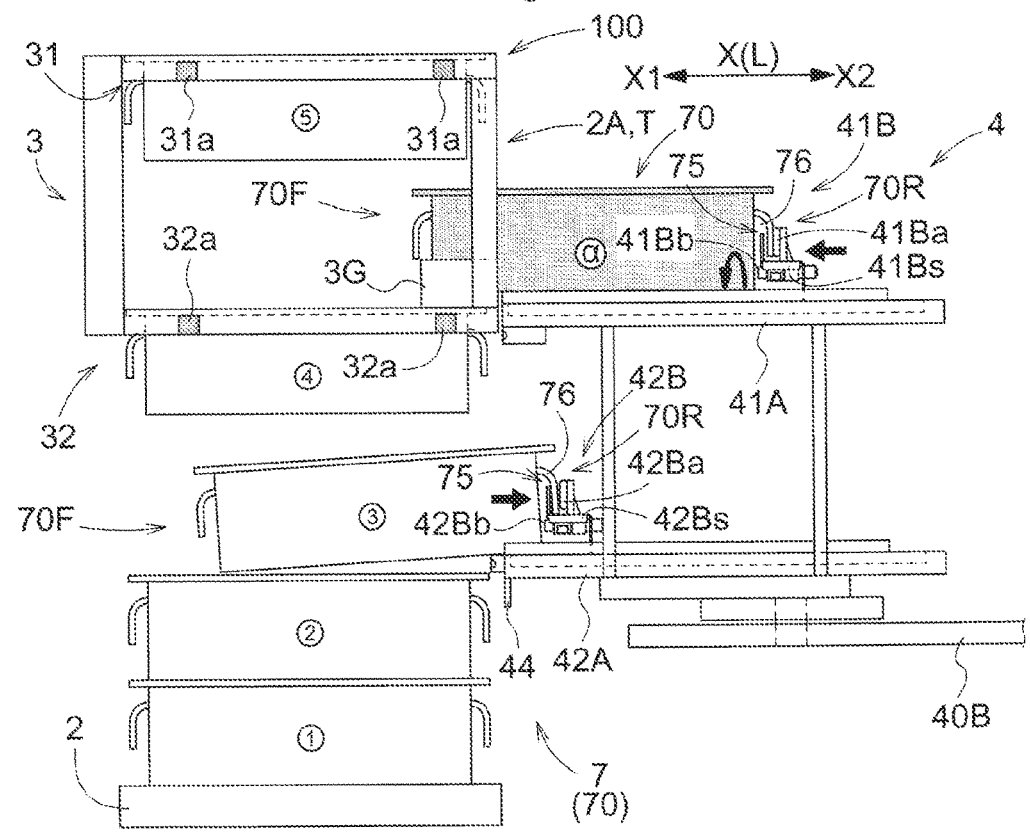
FIG. 27 illustrates parallel operations to pick up and deliver containers from and to the stacking region.

Next, the control device C moves the second lockable portion 42Bb toward the pick-up side X2 in the transfer direction relative to the second holder 42A, and moves the first pusher 41Ba toward the delivery side X1 in the transfer direction relative to the first holder 41A, as shown in FIG. 27. As a result, the second lockable portion 42Bb pulls the container 70 (container "3") to be picked up toward the pick-up side X2 in the transfer direction, and the first pusher 41Ba pushes the container 70 (container "α") to be delivered toward the delivery side X1 in the transfer direction. Here, the container 70 (container "α") to be delivered that is pushed by the first pusher 41Ba is appropriately guided and moved toward the delivery side X1 in the transfer direction by the guide 3G. The control device C in this example switches the first lockable portion 41Bb from the locking orientation to the non-locking orientation in parallel with pushing the container 70 (container "α") to be delivered toward the delivery side X1 in the transfer direction with use of the first pusher 41Ba.

Figure 28:
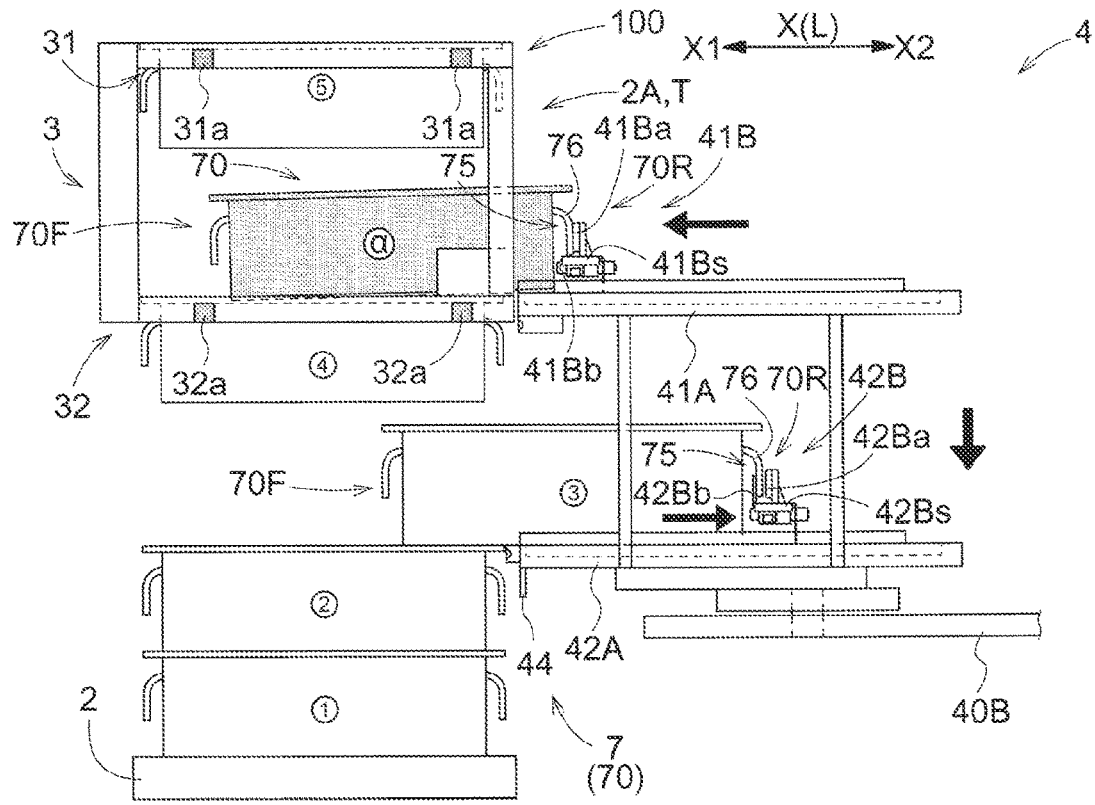
FIG. 28 illustrates parallel operations to pick up and deliver containers from and to the stacking region.

After the container 70 (container "3") to be picked up that is pulled by the second lockable portion 42Bb has been arranged on the second holder 42A, and the container 70 (container "α") to be delivered that is pushed by the first pusher 41Ba has been arranged above the container 70 (container "4") lifted by the second lift holders 32a as shown in FIG. 28, the control device C lowers the first holder 41A and the second holder 42A. This causes the container 70 (container "α") to be delivered that is pushed toward the delivery side X1 in the transfer direction by the first pusher 41Ba to approach, from above, the container 70 (container "4") lifted by the second lift holders 32a and be fitted thereto.

Figure 29:
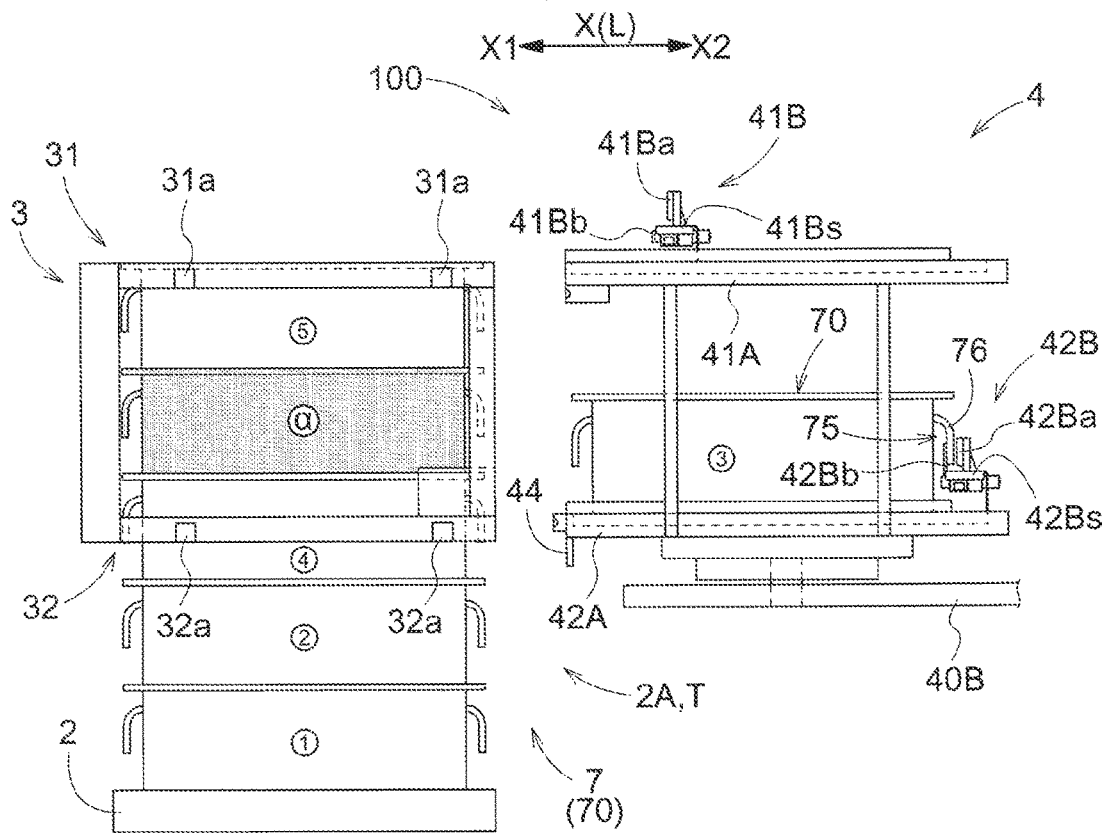
FIG. 29 illustrates parallel operations to pick up and deliver containers from and to the stacking region.

Thereafter, the control device C lowers the first lift holders 31a and the second lift holders 32a, and fits the container 70 (container "4") lifted by the second lifting holding unit 32a to the container 70 (container "2") arranged immediately below the container "4". The control device C then switches the second lift holders 32a from the holding orientation to the non-holding orientation. Thereafter, the control device C further lowers the first lift holders 31a and the second lift holders 32a, and fits the container 70 (container "5") lifted by the first lift holders 31a to the container 70 (conta iner "α") arranged immediately below the container "5". As a result, one container 70 (container "3") of the plurality of containers 70 arranged in the stacking region 2A is replaced with a new container 70 (container "α"), as shown in FIG. 29.

Other Embodiments

Next, other embodiments of the transport apparatus will be described.

(1) The above embodiment has described an example where the lock drive unit Mb changes the orientation of the lockable portion Bb between the locking orientation and the non-locking orientation by rotating the lockable portion Bb about the rotation axis Bxa parallel to the transfer direction X. However, there is no limitation to this example. The lock drive unit Mb may linearly move the lockable portion Bb, or may swing the lockable portion Bb. The lock drive unit Mb can also change the orientation of the lockable portion Bb by operating the lockable portion Bb as above. Note that if the lockable portion Bb is linearly moved, it is preferable to use, for example, a linear motor, a cylinder, a cam mechanism, or the like. If the lockable portion Bb is swung, it is preferable to use, for example, a link mechanism or the like.

(2) The above embodiment has illustrated and described an example where the contact face Baf of the pusher Ba is curved to protrude toward the delivery side X1 in the transfer direction as viewed in the vertical direction, and is a curved face that is vertically straight as viewed in the width direction Y. However, the shape of the contact face Baf is not limited thereto. The shape of the curved face that protrudes toward the delivery side X1 in the transfer direction includes, for example, a hemispherical shape or a partial spherical shape that protrudes toward the delivery side X1 in the transfer direction. Further, the shape of the contact face Baf is not limited to a curved face that protrudes toward the delivery side X1 in the transfer direction. For example, the shape of the contact face Baf may alternatively be a flat face or a polygonal column shape that faces the delivery side X1 in the transfer direction.

(3) The above embodiment has described an example where the container rear face portion 70R has a supported face 74 that faces downward, and the transfer device 4 has the supporters Bss for supporting the supported face 74f from below and lifts the container rear face portion 70R with use of the supporters Bss during the pick-up operation. However, there is no limitation to this example. The container rear face portion 70R need not have a supported face 74f such as the above, and the transfer device 4 need not have supporters Bss such as the above. In this case, the transfer device 4 may alternatively pull a container 70 toward the pick-up side X2 in the transfer direction without lifting the container rear face portion 70R during the pick-up operation.

(4) The above embodiment has described an example where the transfer drive unit Ms causes the lockable portion Bb and the supporters Bss to integrally reciprocate in the transfer direction X. However, there is no limitation to this example. The transfer drive unit Ms may alternatively cause the lockable portion Bb and the supporters Bss to independently reciprocate in the transfer direction X.

(5) The above embodiment has described an example where the support member Bs has a detector Se for detecting that the relative position of the lockable portion Bb with respect to a container 70 is in the lockable range LR. However, there is no limitation to this example. A detector Se such as the above may be provided at any portion other than the support member Bs. Alternatively, the support member Bs need not have a detector Se such as the above.

(6) The above embodiment has described an example where the transport apparatus 100 has the turning device 5 for turning the transfer device 4 about a vertical axis. However, the turning device 5 is not an essential component. Accordingly, the transport apparatus 100 need not have the turning device 5. In this case, the transfer direction X is a direction fixed relative to the transport apparatus 100.

(7) The above embodiment has described an example where the reference position detection sensor Se1 is provided to the pair of the first holder 41A and the first transfer machine 41B, and the stored container detection sensor Se2 is provided to the pair of the second holder 42A and the second transfer machine 42B. However, the pair to which the reference position detection sensor Set is provided and the pair to which the stored container detection sensor Se2 is provided may be opposite to the above description, or both the reference position detection sensor Se1 and the stored container detection sensor Se2 may be provided to either one of the pairs. Further, the reference position detection sensor Se1 may be provided to either one of those pairs, and the stored container detection sensor Se2 may be provided to both pairs.

(8) The above embodiment has described an example where the first transfer machine 41B relatively moves in the transfer direction X with respect to the first holder 41A, and the second transfer machine 42B relatively moves in the transfer direction X with respect to the second holder 42A. However, there is no limitation to this example. A configuration may alternatively be employed in which the first transfer machine 41B and the first holder 41A integrally move in the transfer direction X, and the second transfer machine 42B and the second holder 42A integrally move in the transfer direction X.

(9) The above embodiment has described, regarding the configuration of the container 70, an example where the lifting rib portion 73 to be lifted by the lift device 3 is located in an upper part of the peripheral wall portion 72. However, the lifting rib portion 73 may bay located in any part of the peripheral wall portion 72, and may be, for example, located in a middle part or a lower part in the vertical direction. Further, the portion of the container 70 that is to be lifted by the lift device 3 is not limited to the lifting rib portion 73. The lift device 3 may lift any portion of the container 70. For example, the lift device 3 may lift the container 70 by holding an even portion of the peripheral wall portion 72 of the container 70.

(10) The above embodiment has described an example where the traveling body 1 travels on the floor surface. However, there is no limitation to this example. The traveling body 1 may alternatively travel on a rail installed on the floor surface or near a ceiling. That is, the transport apparatus 100 may be configured as, for example, a ground transport vehicle that travels along a rail installed on the floor surface, or a ceiling transport vehicle that travels along a rail suspended from the ceiling. Further, the transport apparatus 100 may be configured as a stacker crane.

(11) Note that the configuration disclosed in the above embodiment can also be applied in combination with configurations disclosed in other embodiments as long as no contradiction arises. Regarding other configurations as well, the embodiment disclosed in the present specification is merely an example in all respects. Accordingly, various modifications can be made as appropriate without departing from the gist of the present disclosure.

SUMMARY OF THE ABOVE EMBODIMENT

The above transport apparatus will be described below.
A transport apparatus that transports a container includes:
a transfer device having a holder configured to hold the container, the transfer device being configured to move the container in a transfer direction parallel to a horizontal direction and perform transfer operations including: (i)$_a$ delivery operation, which is an operation to transfer the container from the holder to a transfer target location; and (ii) a pick-up operation, which is an operation to transfer the container from the transfer target location to the holder, and the transfer device including:
- a pusher configured to push the container during the delivery operation;
- a lockable portion lockable to the container during the pick-up operation;
- a transfer drive unit configured to cause the pusher and the lockable portion to reciprocate in the transfer direction; and
- a lock drive unit configured to drive the lockable portion separately from the pusher and cause the lockable portion to change in orientation, wherein the container includes:
- a container front face portion facing a delivery side in the transfer direction, the delivery side in the transfer direction being a side in the transfer direction on which the transfer target location is located relative to the holder; and
- a container rear face portion facing a pick-up side in the transfer direction and having a recessed portion that is open in a direction orthogonal to the transfer direction, the pick-up side in the transfer direction being a side in the transfer direction on which the holder is located relative to the transfer target location, the lockable portion is capable of changing in orientation between a locking orientation, in which the lockable portion is insertable into the recessed portion, and a non-locking orientation, in which the lockable portion is outside the recessed portion, by being driven by the lock drive unit while a relative position of the lockable portion with respect to the container is in a predetermined lockable range, the transfer device performs the delivery operation by, with use of the transfer drive unit, moving the pusher toward the delivery side in the transfer direction while the pusher is in contact with the container rear face portion, and the transfer device performs the pick-up operation by, with use of the transfer drive unit, moving the lockable portion in the locking orientation toward the pick-up side in the transfer direction.

According to this configuration, the transfer device includes the pusher configured to push the container during the delivery operation, the lockable portion lockable to the container during the pick-up operation, and the transfer drive unit configured to cause the pusher and the lockable portion to reciprocate in the transfer direction. Further, the transfer device includes the lock drive unit configured to drive the lockable portion separately from the pusher and causes the lockable portion to change in orientation. With this configuration, the transfer device can lock the lockable portion to the container and move the container toward the pick-up side in the transfer direction by driving the lockable portion to assume the locking orientation while the transfer device is performing the pick-up operation. While performing the delivery operation, the transfer device can push the container with the pusher and move the container toward the delivery side in the transfer direction without driving the lockable portion to lock the lockable portion to the container. Accordingly, the time required to perform the operation to deliver the container can be easily shortened. In addition, with the pusher and the lockable portion, the transfer device has a configuration suitable for performing the delivery operation (i.e., push the container) with the pusher, and also has a configuration suitable for performing the pick-up operation (i.e., pull the container) with the lockable portion. That is, this configuration makes it easy to realize a configuration suitable for performing the operation to deliver the container and the operation to pick up the container.

It is preferable that the pusher includes a contact face capable of coming into contact with a center portion, in a width direction, of the container rear face portion during the delivery operation, the width direction being a direction orthogonal to the transfer direction as viewed in a vertical direction, and the contact face is a curved face protruding toward the delivery side in the transfer direction.

According to this configuration, the transfer device can appropriately push and move the container toward the delivery side in the transfer direction by bringing the pusher having a curved face into contact with the container even if the container inclines relative to the transfer direction.

It is preferable that the lock drive unit is configured to rotate the lockable portion about a rotation axis parallel to the transfer direction, the recessed portion is provided in a middle portion, in a width direction, of the container rear face portion, the width direction being a direction orthogonal to the transfer direction as viewed in a vertical direction, the lockable portion has a bar shape or a band shape extending in a direction orthogonal to the rotation axis, and the lockable portion in the locking orientation is positioned in the middle portion, in the width direction, of the container rear face portion.

According to this configuration, the lock drive unit can change the orientation of the lockable portion between the locking orientation and the non-locking orientation by rotating the lockable portion about the rotation axis parallel to the transfer direction. Accordingly, the orientation of the lockable portion can be changed with a relatively simple configuration. Further, this configuration enables the transfer device to appropriately pull and move the container toward the pick-up side in the transfer direction while locking the container with use of the lockable portion positioned at the middle portion in the width direction even if the container to be picked up inclines relative to the transfer direction.

It is preferable that the container rear face portion has a supported face facing downward, the transfer device further includes:
- a supporter configured to support the supported face from below; and
- a raising-lowering drive unit configured to raise and lower the supporter, and the transfer drive unit causes the lockable portion and the supporter to integrally reciprocate in the transfer direction.

According to this configuration, the transfer device can lift the container rear face portion by raising the supporter with use of the raising-lowering drive unit with the supporter supporting the supported face of the container rear face portion from below. The operation to pick up the container can be appropriately performed as a result of the transfer drive unit moving, in this state, the lockable portion inserted in the recessed portion and the supporter lifting the container rear face portion toward the pick-up side in the transfer direction. This configuration is preferable in the case where the transfer device causes the container to be picked up moving toward the pick-up side in the transfer direction to moving over a level difference, for example.

It is preferable that the recessed portion is covered on the pick-up side in the transfer direction by a locking wall portion, the lockable portion and the pusher are in a fixed positional relationship in the transfer direction, the lockable range is a range of relative positions of the lockable portion with respect to the container at which the lockable portion is positioned in the recessed portion, which is located on the delivery side in the transfer direction with respect to the locking wall portion, while the lockable portion is in the locking orientation, and the lockable portion and the pusher are in a positional relationship that is set such that the lockable portion is positioned in the lockable range while the pusher is in contact with the locking wall portion from the pick-up side in the transfer direction.

According to this configuration, the transfer device can insert the lockable portion into the recessed portion and cause the lockable portion to assume the locking orientation even if the pusher is located farthest on the delivery side in the transfer direction relative to the container. Accordingly, the orientation of the lockable portion can be changed to locking orientation more reliably. In addition, the lockable portion and the pusher are arranged in a positional relationship in which the lockable portion and the pusher sandwich the locking wall portion in the transfer direction with the lockable portion being located in the lockable range. Accordingly, the lockable portion and the pusher can support the locking wall portion from both sides in the transfer direction while the transfer device is performing the pick-up operation. Thus, the transfer device can stably perform the pick-up operation.

It is preferable that the transfer device includes a support member supporting the pusher and the lockable portion, the transfer drive unit causes the support member to reciprocate in the transfer direction, and the support member includes a detector configured to detect that a relative position of the lockable portion with respect to the container is in the lockable range.

According to this configuration, the transfer device can cause the lockable portion to assume the locking orientation based on the result of detection by the detector. Therefore, the lockable portion can be appropriately arranged in the lockable range while the transfer device is performing the pick-up operation.

INDUSTRIAL APPLICABILITY

The technique pertaining to the present disclosure can be used for a transport apparatus that transports containers.

What is claimed is:

1. A transport system comprising:
a container; and
a transport apparatus configured to transport the container,
wherein the transport apparatus comprises a transfer device having a holder configured to hold the container,
wherein the transfer device is configured to move the container in a transfer direction parallel to a horizontal direction and perform transfer operations including: (i) a delivery operation, which is an operation to transfer the container from the holder to a transfer target location; and (ii) a pick-up operation, which is an operation to transfer the container from the transfer target location to the holder,
wherein the transfer device comprises:
a pusher configured to push the container during the delivery operation;
a lockable portion lockable to the container during the pick-up operation;
a transfer drive unit configured to cause the pusher and the lockable portion to reciprocate in the transfer direction; and
a lock drive unit configured to drive the lockable portion separately from the pusher and cause the lockable portion to change in orientation,
wherein the container comprises:
a container front face portion facing a delivery side in the transfer direction, and the delivery side in the transfer direction is a side in the transfer direction on which the transfer target location is located relative to the holder; and
a container rear face portion facing a pick-up side in the transfer direction and comprising a recessed portion that is open in a direction orthogonal to the transfer direction, and the pick-up side in the transfer direction is a side in the transfer direction on which the holder is located relative to the transfer target location,
wherein the lockable portion is capable of changing in orientation between a locking orientation, in which the lockable portion is insertable into the recessed portion, and a non-locking orientation, in which the lockable portion is outside the recessed portion, by being driven by the lock drive unit while a relative position of the lockable portion with respect to the container is in a predetermined lockable range,
wherein the transfer device performs the delivery operation by, with use of the transfer drive unit, moving the pusher toward the delivery side in the transfer direction while the pusher is in contact with the container rear face portion, and
wherein the transfer device performs the pick-up operation by, with use of the transfer drive unit, moving the lockable portion in the locking orientation toward the pick-up side in the transfer direction.

2. The transport system according to claim 1,
wherein the pusher comprises a contact face capable of coming into contact with a center portion, in a width direction, of the container rear face portion during the delivery operation, and the width direction is a direction orthogonal to the transfer direction as viewed in a vertical direction, and
wherein the contact face is a curved face protruding toward the delivery side in the transfer direction.

3. The transport system according to claim 1,
wherein the lock drive unit is configured to rotate the lockable portion about a rotation axis parallel to the transfer direction,
wherein the recessed portion is provided in a middle portion, in a width direction, of the container rear face portion, and the width direction is a direction orthogonal to the transfer direction as viewed in a vertical direction,
wherein the lockable portion has a bar shape or a band shape extending in a direction orthogonal to the rotation axis, and
wherein the lockable portion in the locking orientation is positioned in the middle portion, in the width direction, of the container rear face portion.

4. The transport system according to claim 1,
wherein the container rear face portion has a supported face facing downward,
wherein the transfer device further comprises:
- a supporter configured to support the supported face from below; and
- a raising-lowering drive unit configured to raise and lower the supporter, and wherein the transfer drive unit causes the lockable portion and the supporter to integrally reciprocate in the transfer direction.

5. The transport system according to claim 1,
wherein the recessed portion is covered on the pick-up side in the transfer direction by a locking wall portion,
wherein the lockable portion and the pusher are in a fixed positional relationship in the transfer direction,
wherein the lockable range is a range of relative positions of the lockable portion with respect to the container at which the lockable portion is positioned in the recessed portion, which is located on the delivery side in the transfer direction with respect to the locking wall portion, while the lockable portion is in the locking orientation, and
wherein the lockable portion and the pusher are in a positional relationship that is set such that the lockable portion is positioned in the lockable range while the pusher is in contact with the locking wall portion from the pick-up side in the transfer direction.

6. The transport system according to claim 1,
wherein the transfer device comprises a support member supporting the pusher and the lockable portion,
wherein the transfer drive unit causes the support member to reciprocate in the transfer direction, and
wherein the support member comprises a detector configured to detect that a relative position of the lockable portion with respect to the container is in the lockable range.

7. The transport system according to claim 1,
wherein the lock drive unit is configured to drive the lockable portion separately from the pusher and cause the lockable portion to rotate about a rotation axis parallel to the transfer direction.

8. The transport system according to claim 1,
wherein the lock drive unit is configured to drive the lockable portion separately from the pusher and cause the lockable portion to rotate about a rotation axis parallel to the transfer direction,
wherein the recessed portion is open vertically downward, and
wherein the lockable portion in the non-locking orientation is positioned immediately below the recessed portion.

9. The transport system according to claim 1,
wherein the transfer device includes a support member configured to support the pusher and the lockable portion,
wherein the transfer drive unit causes the support member to reciprocate in the transfer direction,
wherein the lockable portion is supported by the support member such that the lockable portion is rotatable about a rotation axis parallel to the transfer direction,
wherein the pusher is fixed to the support member, and
wherein the lock drive unit is configured to drive the lockable portion separately from the pusher and cause the lockable portion to rotate about a rotation axis parallel to the transfer direction.

10. The transport system according to claim 1,
wherein the pusher is disposed on the pick-up side in the transfer direction relative to the lockable portion in the locking orientation.

11. The transport system according to claim 1,
wherein the recessed portion is covered on the pick-up side in the transfer direction by a locking wall portion, and
wherein the transfer device performs the delivery operation, with use of the transfer drive unit, by moving the pusher toward the delivery side in the transfer direction while the pusher is in contact with the locking wall portion from the pick-up side in the transfer direction.

12. The transport system according to claim 1,
wherein the recessed portion is covered on the pick-up side in the transfer direction by a locking wall portion, and
wherein the pusher is positioned on the pick-up side in the transfer direction relative to the locking wall portion so that the locking wall portion is between the pusher and the lockable portion in the locking orientation.

* * * * *